US007828020B2

(12) United States Patent
Girard et al.

(10) Patent No.: US 7,828,020 B2
(45) Date of Patent: Nov. 9, 2010

(54) REPLACEABLE CONCENTRATE/EXTRACT CARTRIDGE FOR A LIQUID CONCENTRATE/EXTRACT BEVERAGE DISPENSER

(75) Inventors: Jeffrey J. Girard, Gilbert, AZ (US); Mario E. Vassaux, Scottsdale, AZ (US); Roy Kenneth Fischer, Scottsdale, AZ (US); Richard Symington, Scottsdale, AZ (US); Erik Kenneth Anderson, Phoenix, AZ (US); Shlomo Greenwald, Ithaca, NY (US); Zipora Greenwald, Ithaca, NY (US); Nassar Pirshafiey, Thousand Oaks, CA (US)

(73) Assignee: Intelligent Coffee Company, LLC, Scottsdale, AZ (US)

( * ) Notice: Subject to any disclaimer, the term of this patent is extended or adjusted under 35 U.S.C. 154(b) by 0 days.

(21) Appl. No.: 12/569,066

(22) Filed: Sep. 29, 2009

(65) Prior Publication Data

US 2010/0089944 A1    Apr. 15, 2010

Related U.S. Application Data

(62) Division of application No. 11/055,832, filed on Feb. 11, 2005, now Pat. No. 7,594,525.

(60) Provisional application No. 60/642,311, filed on Jan. 7, 2005, provisional application No. 60/620,251, filed on Oct. 19, 2004, provisional application No. 60/544,379, filed on Feb. 13, 2004.

(51) Int. Cl.
*B65B 1/04* (2006.01)

(52) U.S. Cl. ............. 141/2; 141/301; 141/351; 141/355; 141/360; 141/362; 222/333; 222/504

(58) Field of Classification Search ............ 141/2, 141/351, 352, 355, 360–364, DIG. 1; 222/333, 222/504, 571, 325, 129.1, 105, 214; 251/149.6
See application file for complete search history.

(56) References Cited

U.S. PATENT DOCUMENTS

| 1,949,661 | A | 3/1934 | Schell |
| 2,254,833 | A | 9/1941 | Ashkenaz |
| 2,554,570 | A | 5/1951 | Harvey |
| 2,682,984 | A | 7/1954 | Melikian et al. |
| 2,887,255 | A | 5/1959 | Bauerlein |
| 2,979,231 | A | 4/1961 | Witherspoon, Jr. |
| 3,024,718 | A | 3/1962 | Morrison |
| 3,258,166 | A | 6/1966 | Kückens |
| 3,264,973 | A | 8/1966 | Tavera |

(Continued)

FOREIGN PATENT DOCUMENTS

DE       29 21 579       11/1980

(Continued)

*Primary Examiner*—Timothy L Maust
(74) *Attorney, Agent, or Firm*—Volpe and Koenig, P.C.

(57) ABSTRACT

A concentrate/extract cartridge for a beverage dispenser adapted to dispense a liquid concentrate/extract and a diluent is provided. The cartridge includes a hollow body for containing liquid concentrate/extract and an aperture. A pumping device is connected to the hollow body for dispensing the liquid concentrate/extract from the hollow body through the aperture. A method for dispensing a liquid concentrate/extract from a beverage dispenser using a concentrate/extract cartridge is also provided in which the concentrate/extract does not come into contact with the dispenser.

20 Claims, 20 Drawing Sheets

U.S. PATENT DOCUMENTS

| | | | |
|---|---|---|---|
| 3,532,505 A | 10/1970 | Cornelius | |
| 3,634,107 A | 1/1972 | Cornelius | |
| 3,641,918 A | 2/1972 | Schellgell et al. | |
| 3,719,505 A | 3/1973 | Mazza | |
| 3,727,632 A | 4/1973 | Pansini | |
| 3,828,985 A | 8/1974 | Schindler | |
| 4,011,969 A | 3/1977 | Martin | |
| 4,015,755 A | 4/1977 | Lerner et al. | |
| 4,096,893 A | 6/1978 | Harvey, Jr. et al. | |
| 4,164,964 A | 8/1979 | Daniels | |
| 4,334,640 A | 6/1982 | van Overbruggen | |
| 4,356,937 A | 11/1982 | Simon et al. | |
| 4,393,982 A | 7/1983 | Kückens | |
| 4,450,987 A | 5/1984 | Boettcher | |
| 4,470,999 A | 9/1984 | Carpiac | |
| 4,471,689 A | 9/1984 | Piana | |
| 4,503,507 A | 3/1985 | Takeda et al. | |
| 4,515,294 A | 5/1985 | Udall | |
| 4,518,105 A | 5/1985 | Kuckens et al. | |
| 4,550,858 A | 11/1985 | Noomen | |
| 4,624,395 A | 11/1986 | Baron et al. | |
| 4,660,742 A | 4/1987 | Ozdemir | |
| 4,708,266 A | 11/1987 | Rudick | |
| 4,722,372 A | 2/1988 | Hoffman et al. | |
| 4,791,859 A | 12/1988 | King | |
| 4,808,346 A | 2/1989 | Strenger | |
| 4,887,740 A * | 12/1989 | Smith | 222/129.1 |
| 4,901,886 A | 2/1990 | Kirschner | |
| 4,901,890 A | 2/1990 | Mivelaz | |
| 4,903,586 A | 2/1990 | King | |
| 4,921,131 A | 5/1990 | Binderbauer et al. | |
| 5,025,714 A | 6/1991 | Brewer | |
| 5,111,740 A | 5/1992 | Klein | |
| 5,114,047 A | 5/1992 | Baron et al. | |
| 5,154,319 A | 10/1992 | Deininger et al. | |
| 5,188,019 A | 2/1993 | Vahabpour | |
| 5,190,652 A | 3/1993 | van Thoor et al. | |
| 5,193,593 A | 3/1993 | Denis et al. | |
| 5,197,865 A | 3/1993 | Sevrain et al. | |
| 5,269,443 A | 12/1993 | Lancaster | |
| 5,275,309 A | 1/1994 | Baron et al. | |
| 5,295,611 A | 3/1994 | Simard | |
| 5,312,017 A | 5/1994 | Schroeder et al. | |
| 5,332,123 A | 7/1994 | Farber et al. | |
| 5,353,963 A | 10/1994 | Gorski et al. | |
| 5,477,883 A * | 12/1995 | Totten | 137/614.03 |
| 5,615,801 A | 4/1997 | Schroeder et al. | |
| 5,656,316 A | 8/1997 | Fond et al. | |
| 5,662,461 A | 9/1997 | Ono | |
| 5,740,719 A | 4/1998 | Triola et al. | |
| 5,836,482 A | 11/1998 | Ophardt et al. | |
| 5,842,603 A | 12/1998 | Schroeder et al. | |
| 5,895,672 A | 4/1999 | Cooper | |
| 5,909,846 A | 6/1999 | Sasaki | |
| 5,918,768 A | 7/1999 | Ford | |
| 5,975,357 A | 11/1999 | Topar | |
| 5,992,685 A | 11/1999 | Credle, Jr. | |
| 6,073,539 A | 6/2000 | Triola et al. | |
| 6,161,722 A | 12/2000 | Sooudi et al. | |
| 6,173,117 B1 | 1/2001 | Clubb | |
| 6,209,751 B1 | 4/2001 | Goodin et al. | |
| 6,343,724 B1 | 2/2002 | Ophardt et al. | |
| 6,394,312 B1 | 5/2002 | Endou | |
| 6,564,968 B1 | 5/2003 | Terrell et al. | |
| 6,568,565 B1 | 5/2003 | Schroeder et al. | |
| 6,589,577 B2 | 7/2003 | Lazaris et al. | |
| 6,607,762 B2 | 8/2003 | Lazaris et al. | |
| 6,644,173 B2 | 11/2003 | Lazaris et al. | |
| 6,651,849 B2 | 11/2003 | Schroeder et al. | |
| 6,662,976 B2 | 12/2003 | Jensen et al. | |
| 6,676,908 B2 | 1/2004 | Robinson, Sr. et al. | |
| 6,698,333 B2 | 3/2004 | Halliday et al. | |
| 6,708,741 B1 * | 3/2004 | Berry et al. | 141/362 |
| 6,722,527 B1 | 4/2004 | Krauss | |
| 6,740,345 B2 | 5/2004 | Cai | |
| 6,808,731 B1 | 10/2004 | Gutwein et al. | |
| 6,810,931 B2 | 11/2004 | Graffin et al. | |
| 6,886,556 B2 | 5/2005 | Fuchs | |
| 6,974,052 B1 | 12/2005 | D'hond et al. | |
| 6,990,391 B1 | 1/2006 | Cunha et al. | |
| 7,048,149 B1 | 5/2006 | Lassota | |
| 7,077,339 B2 | 7/2006 | Leach | |
| 7,182,280 B2 | 2/2007 | Ye et al. | |
| 7,594,525 B2 * | 9/2009 | Girard et al. | 141/362 |
| 2002/0148356 A1 | 10/2002 | Lazaris et al. | |
| 2003/0145736 A1 | 8/2003 | Green | |
| 2004/0074921 A1 | 4/2004 | Lips et al. | |
| 2004/0084475 A1 | 5/2004 | Bethuy et al. | |
| 2004/0226962 A1 | 11/2004 | Mazursky et al. | |
| 2006/0144244 A1 | 7/2006 | Girard et al. | |
| 2006/0283889 A1 | 12/2006 | Mink et al. | |
| 2008/0029541 A1 | 2/2008 | Wallace et al. | |
| 2009/0057341 A1 | 3/2009 | Girard et al. | |

FOREIGN PATENT DOCUMENTS

| | | |
|---|---|---|
| DE | 19523816 | 1/1997 |
| FR | 2813861 | 3/2002 |
| JP | 3129494 | 6/1991 |
| JP | 6211299 | 8/1994 |
| NL | 1003894 | 5/1998 |
| WO | 89/01751 | 3/1989 |
| WO | 91/18826 | 12/1991 |
| WO | 99/37577 | 7/1999 |
| WO | 00/79224 | 12/2000 |
| WO | 01/49154 | 7/2001 |
| WO | 02/081354 | 10/2002 |
| WO | 2004/104527 | 12/2004 |
| WO | 2005/070816 | 8/2005 |
| WO | 2005/071267 | 8/2005 |
| WO | 2005/079361 | 9/2005 |

* cited by examiner

REPLACEABLE CONCENTRATE/EXTRACT CARTRIDGE FOR A LIQUID CONCENTRATE/EXTRACT BEVERAGE DISPENSER

CROSS REFERENCE TO RELATED APPLICATIONS

This application is a divisional application of U.S. application Ser. No. 11/055,832 filed on Feb. 11, 2005, and claims the benefit of U.S. provisional application No. 60/544,379, filed Feb. 13, 2004, U.S. provisional application No. 60/620,251, filed Oct. 19, 2004, and U.S. provisional application No. 60/642,311, filed Jan. 7, 2005, which are incorporated by reference as if set forth herein.

BACKGROUND

The present invention relates to a replaceable concentrate cartridge for a beverage dispenser which dispenses a beverage made from a diluent, such as water, and a liquid beverage concentrate/extract. More particularly, the invention relates to a hot beverage dispenser for dispensing hot coffee, hot tea or hot chocolate made from a liquid beverage concentrate/extract and water.

Beverage dispensers are known for making a beverage from a liquid concentrate/extract. In one known prior art reference, a pressurized liquid canister of liquid beverage concentrate/extract is placed within a pitcher-shaped device having a mechanism for releasing a predetermined amount of liquid concentrate/extract from the pressurized canister into a beverage mixing chamber. A heated liquid reservoir is located at the bottom of the vessel and heated liquid is also forced upwardly into the mixing chamber where the mixed beverage is formed in the device prior to being poured. This device has several drawbacks due to the complex nature of the dispensing mechanism and the need to clean out the mixing chamber in the device after each use. It is also known to provide a coffee machine for use with shelf-stable liquid coffee concentrate/extract. The liquid coffee concentrate/extract is poured into a reservoir in the coffee maker and a predetermined amount of the concentrate/extract is moved from the reservoir to the brewing chamber, where it is mixed with heated water prior to being dispensed into a carafe. While this device overcomes the need for coffee filters and ground coffee and allows the use of a shelf-stable liquid coffee concentrate/extract, the entire machine must be cleaned after use, due to the fact that the coffee concentrate/extract is poured into the coffee machine prior to being delivered to a brewing chamber in the machine. Additionally, it is not possible to switch the type of beverage being dispensed in an easy and convenient manner.

It has also been suggested to provide a beverage system for brewing a beverage from a dry beverage material and a source of hot, pressurized water. The beverage material is provided in a sealed cartridge and the dispenser pierces the sealed cartridge and injects hot, pressurized water into the cartridge to brew the beverage from the beverage material. A carousel device may be provided, which allows a user to select from one of several different beverage cartridges. However, a drawback of this device is that residue from a previous beverage will remain in the hot, pressurized water-injecting area as well as in the downstream collection funnel, which directs the beverage into a user's cup.

It would be desirable to provide a more convenient and easy way to mix and dispense multiple types of beverages from a single-beverage dispenser in a convenient and user friendly manner, and also without the need for cleaning the dispenser when a user wishes to change the type of beverage being dispensed. It would also be desirable to allow a user to select a beverage strength from a number of different selections so that a user's preference can be satisfied. It would also be desirable to provide a beverage dispenser that does not waste excess beverage concentrate/extract and allows a user to select from multiple beverage types and to select from multiple beverage container sizes, such as coffee mugs or disposable cups having different sizes while still providing the beverage at a desired strength.

SUMMARY

Briefly stated, the present invention provides a concentrate/extract cartridge for a beverage dispenser adapted to dispense a liquid concentrate/extract and a diluent. The cartridge includes a hollow body for containing liquid concentrate/extract and an aperture for discharging liquid concentrate/extract. A pumping device is connected to the hollow body for dispensing the liquid concentrate/extract from the hollow body through the aperture. A method for dispensing a liquid concentrate/extract from a beverage dispenser using a concentrate/extract cartridge is also provided.

In one embodiment, the pumping device includes a movable piston positioned in the hollow body in contact with an interior surface of the hollow body defining a concentrate/extract containing chamber between the piston and the interior surface.

In another embodiment, the hollow body includes a dispensing tube, and the pumping device includes a valve seat connected to the dispensing tube. The valve seat includes a port for passing a flow of concentrate/extract through the dispensing tube. A valve body is in movable contact with the valve seat to alternately cover and uncover the port. A piston is connected to the valve body movable within the dispensing tube for forcing concentrate/extract through the port.

BRIEF DESCRIPTION OF THE DRAWING(S)

The foregoing Summary as well as the following detailed description will be readily understood in conjunction with the appended drawings which illustrate preferred embodiments of the invention. In the drawings.

DETAILED DESCRIPTION OF THE PREFERRED EMBODIMENT(S)

Figure 1:
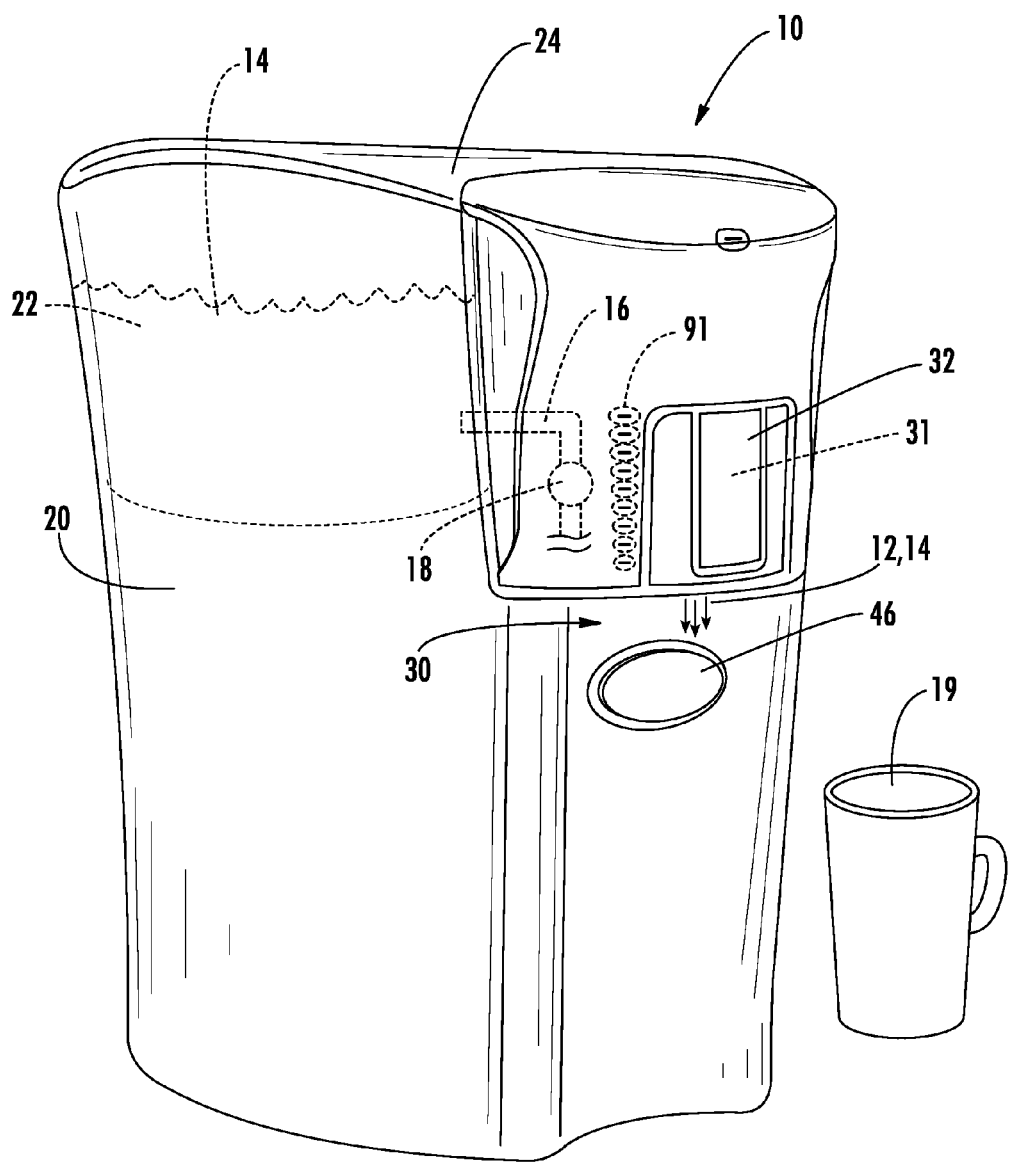
FIG. 1 is a right perspective view of a beverage dispenser in accordance with a first preferred embodiment of the present invention.

Certain terminology is used in the following description for convenience only and is not considered limiting. Words such as "front", "back", "top" and "bottom" designate directions in the drawings to which reference is made. This terminology includes the words specifically noted above, derivatives thereof and words of similar import. Additionally, the terms "a" and "one" are defined as including one or more of the referenced item unless specifically noted.

The preferred embodiments of the present invention will be described with reference to the drawing figures where like numerals represent like elements throughout.

Referring now to FIG. 1, a beverage dispenser 10 adapted to dispense a beverage comprising a liquid concentrate/extract (designated by arrow 12) and a diluent 14 (in a reservoir 22 and designated by arrows in a dispensing area 30) is provided. The dispenser 10 includes a housing 20 with a diluent reservoir 22 located therein. The housing 20 is preferably a molded polymeric housing. However, those skilled in the art will recognize that other materials can be used to form the housing 20. Additionally, the diluent reservoir 22 is preferably also made of a molded polymeric, hydrolysis-resistant material, such as polyethylene or HDPE. However, any other suitable food grade material may be utilized. Preferably, a removable cover 24 is located on top of the dispenser housing 20 and covers the diluent reservoir 22. Alternatively, a mesh grid arrangement can be provided so that the cover 24 need not be removable and liquid diluent 14, such as water, can be poured directly through the cover 24 and into the reservoir 22. Preferably, the cover 24 is also made of a suitable molded polymeric material. However, other types of materials may be used, if desired.

Figure 2:
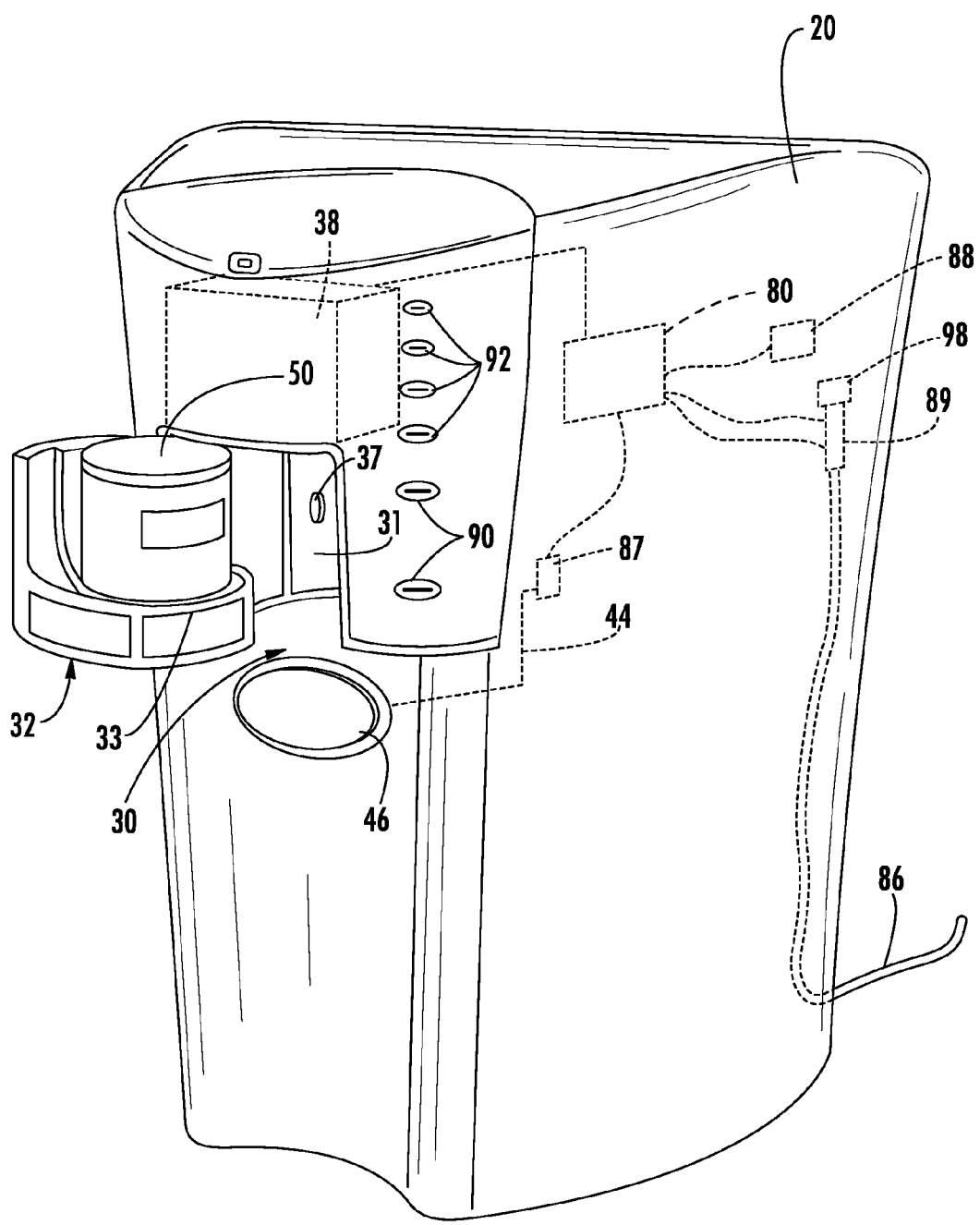
FIG. 2 is a left perspective view of the beverage dispenser of FIG. 1 in a cartridge loading position.

As shown in FIGS. 1 and 2, a dispensing area 30 is located at the front of the dispenser housing 20. The dispensing area 30 is adapted to allow placement of a beverage container, such as a cup, thereunder. Preferably, the housing 20 is sized and shaped so that a variety of different sized beverage containers, such as glasses, coffee cups or mugs or various other beverage containers can be placed under the dispensing area 30, which is preferably at the front of the housing 20.

Figure 2A:
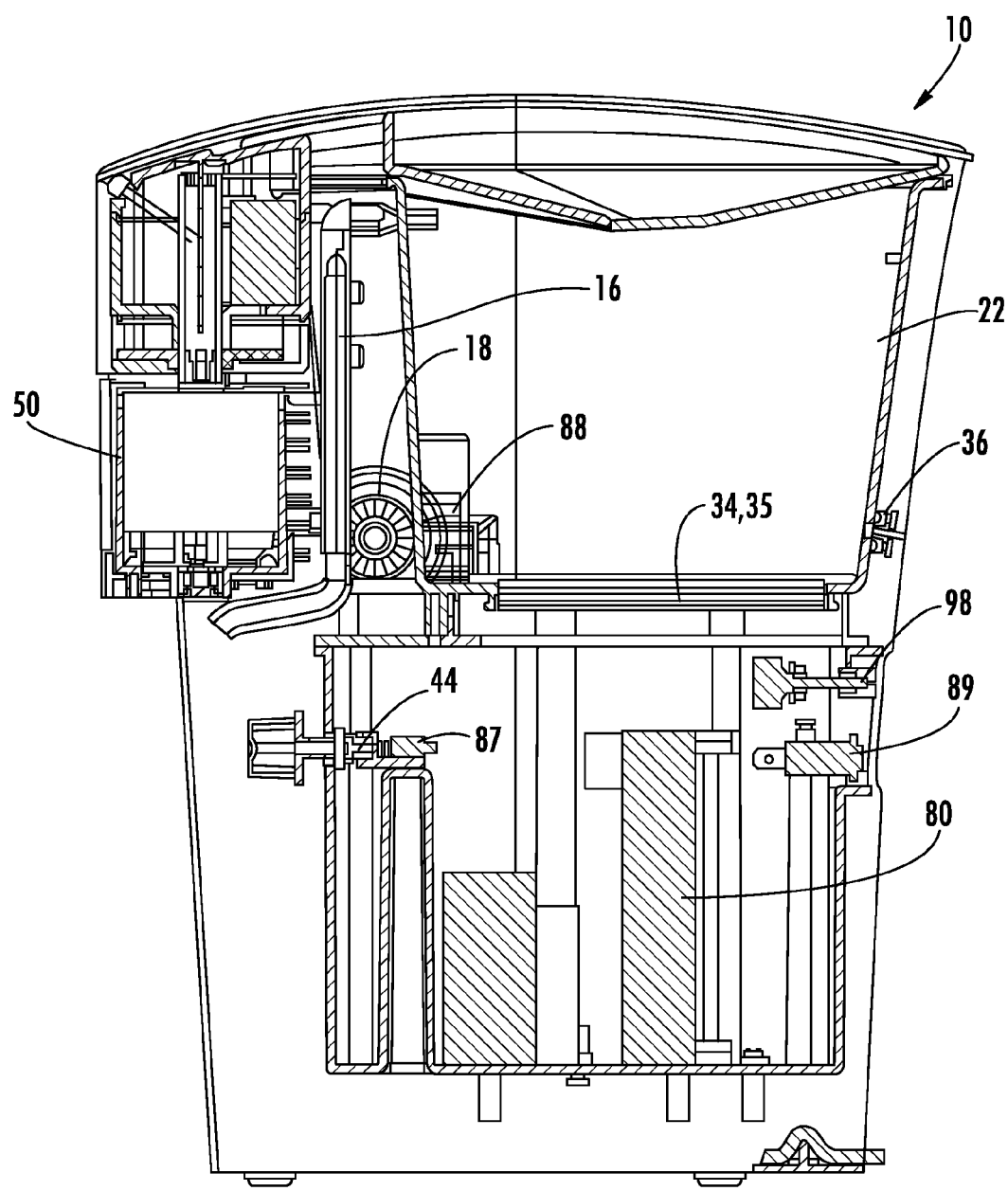
FIG. 2a is a side elevation view of the beverage dispenser of FIG. 1 partially in section.

In a preferred embodiment, the diluent reservoir 22 is heated by a heating element 34, which is shown in detail in FIG. 2a. This is preferably installed with a seal 35 into an opening located at the bottom of the diluent reservoir 22 and is thermostatically controlled via a thermostat 36, which senses when a predetermined temperature has been reached. While use of the heating element 34 is optional so that cold or room temperature as well as hot beverages can be dispensed using the dispenser 10, in one particularly preferred embodiment wherein the dispenser 10 is used as a hot beverage dispenser, such as for hot coffee, hot tea and/or hot chocolate, a heating element 34 is required.

While in the preferred embodiment shown, the heating element 34 is located under the diluent reservoir 22, it is also possible to utilize a flash heater located between the reservoir 22 and the dispensing area 30 to heat the diluent 14 prior to it being dispensed. Electric flash heaters are known and may require a longer fluid path for the diluent 14 so that a proper temperature can be achieved prior to dispensing.

As shown in FIGS. 1-3a, preferably a reservoir supply line 16 is connected to the reservoir 22 and delivers the diluent 14 to the dispensing area. The supply line 16 is preferably connected to a pump 18 that can dispense water from the reservoir to the dispensing area at varying rates. Alternatively, the supply line 16 could be connected to a control valve as described below with reference to the second preferred embodiment shown in FIGS. 8-14.

As shown in FIGS. 1-3a, a cartridge receiving area 31 is located in the housing 20. The cartridge receiving area 31 is preferably in the form of a recess located in the housing 20 sized to receive a beverage concentrate/extract cartridge 50, described in detail below. A loading door 32 swings open for loading the cartridge 50 into a cartridge holder 33, preferably located on the door 32, and swings closed to position the cartridge 50 in the cartridge receiving area 31 below a cartridge dispensing actuator 38, described in detail below. An alignment pin 45 is preferably provided on a cylinder 51 of the cartridge 50 mates with a corresponding aperture in the cartridge holder 33 to locate and prevent rotation of the cartridge 50.

Referring to FIGS. 4-7, the concentrate/extract cartridge 50 which is adapted to hold a beverage concentrate/extract 12 is shown in detail. In a preferred embodiment, the concentrate/extract cartridge 50 comprises a hollow body, preferably in the form of a cylinder 51, with a bottom wall 52 and an open top 53. A piston 57 is located in the open top 53. An interior surface 59 of the cylinder 51 and the piston 57 define a concentrate/extract containing chamber 58.

The cartridge cylinder 51 and piston 57 are preferably made of a suitable polymeric material, such as polypropylene or polyethylene that will not contaminate the beverage concentrate/extract 12 and will maintain it in a sterile and/or aseptic manner. Alternatively, any other suitable food grade material may be used for the cartridge cylinder 51 and piston 57. Also, the cylinder 51 is preferably constructed of a transparent or translucent material in order to allow a user to determine the volume of concentrate/extract 12 remaining in the cartridge 50. Further, the cylinder 51 and piston 57 must each have sufficient wall thickness to sustain the pressure formed during the process of actuation, as described below, without significant deformation.

The cylinder 51 is provided with a dispensing tube 54 for passing concentrate/extract from the concentrate/extract containing chamber 58 to the dispensing area 30. Preferably, a plug 72 having a flow orifice 73 is connected to the dispensing tube 54 to regulate a flow of the concentrate/extract 12. The plug 72 is preferably threaded with a varying diameter pipe thread and mates with corresponding threads on an inner surface of the dispensing tube 54. Blind holes 74 are provided for receiving a spanner wrench or similar type tool for installing or removing the plug 72. Alternatively, any suitable structure can be provided on or integral with the plug 72 to aid in its installation and removal. Since the plug 72 is modular, differently sized orifices may be selected to accommodate different concentrate/extract viscosities. Alternatively, the plug 72 may be omitted and the flow orifice 73 may be provided integrally with the dispensing tube 54.

Figure 6:
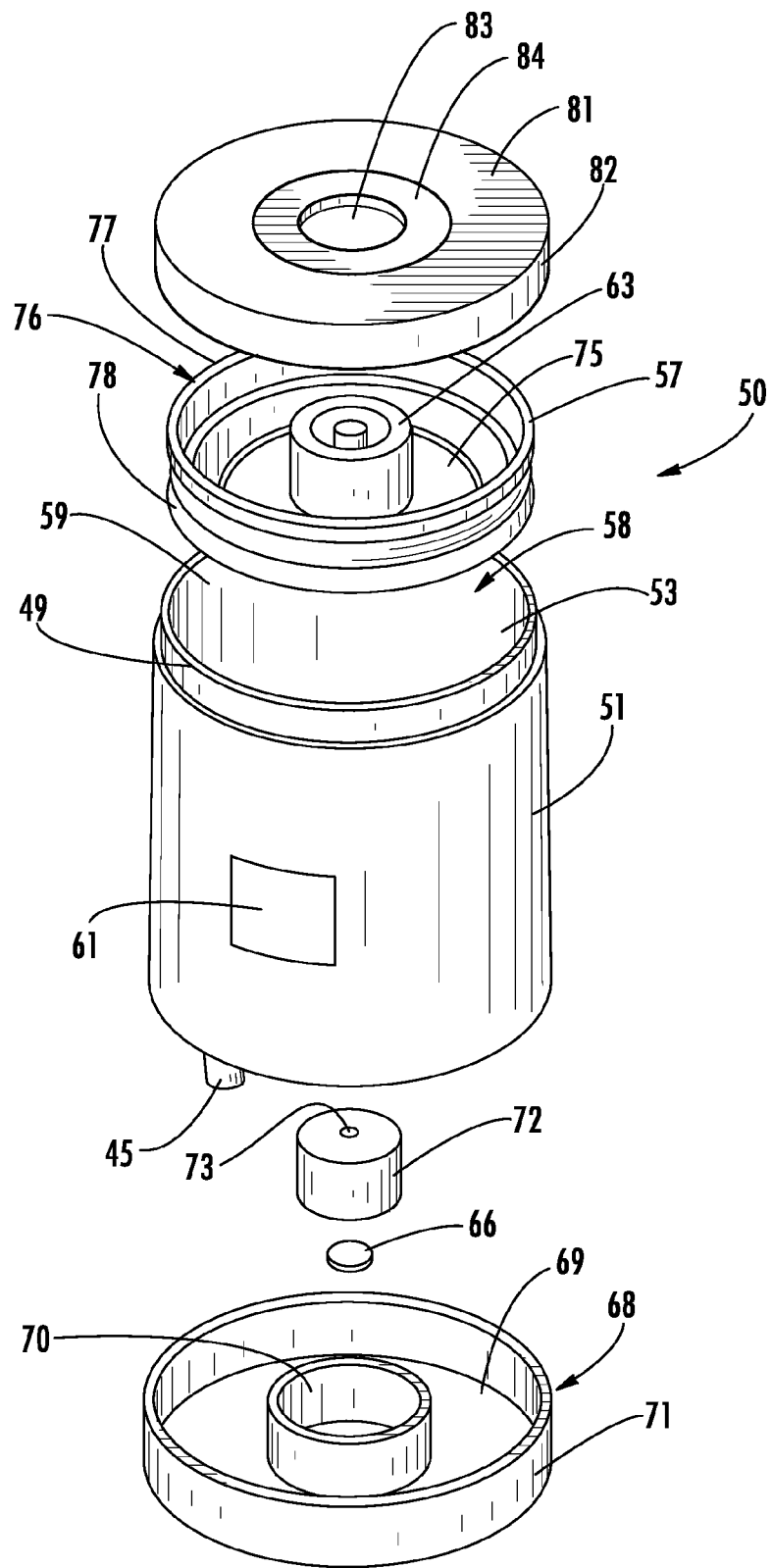
FIG. 6 is an exploded perspective view of the concentrate/extract cartridge dispenser of FIG. 4 including its removable bottom cap.
Figure 7:
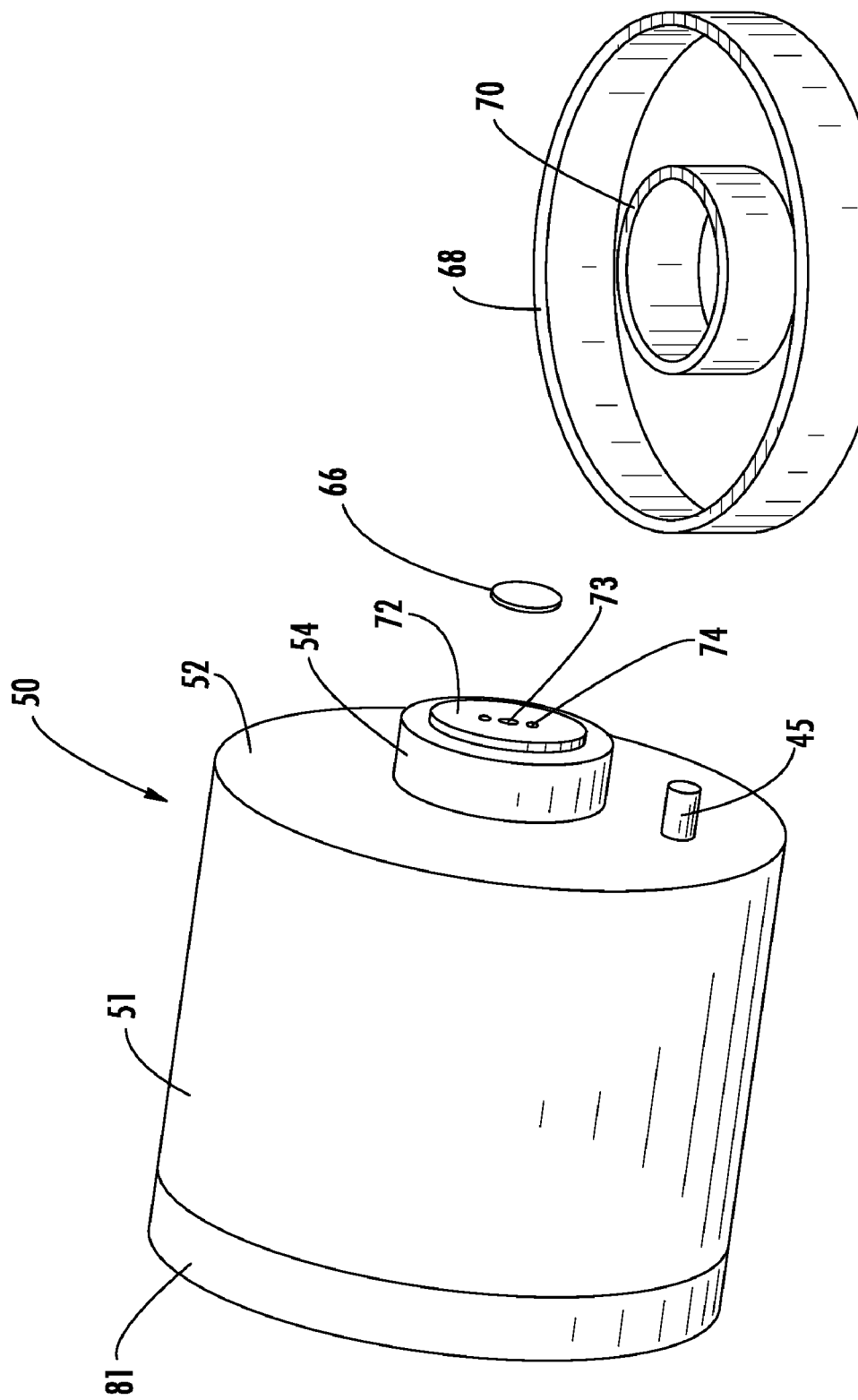
FIG. 7 is a perspective view of the concentrate/extract cartridge dispenser of FIG. 4 including its removable bottom cap.

As shown in FIGS. 6 and 7, in a preferred embodiment a foil pad 66 and a bottom cap 68 are located over an end of the dispensing tube 54 during storage and prior to installation of the cartridge 50 inside the housing 20. The foil pad 66 preferably contains an adhesive surface and is placed over the orifice 73 on the plug 72 creating a seal to form an effective air barrier. The bottom cap 68 includes a base 69 and a connector body 70, attached to the base 69, preferably having internal threads which mate with external threads on the dispensing tube 54. A bottom flange 71 extends from a periphery of the base 69 and contacts with the bottom wall 52 of the cylinder 51. The foil pad 66 in cooperation with the bottom cap 68 help to maintain the contents 12 of the cartridge 50 in a sterile and/or aseptic state until the cartridge 50 is installed.

The piston 57 effectively prevents the concentrate/extract 12 from leaking from the containing chamber 58 through the open top 53 of the cylinder 51. The piston 57 preferably includes a compliant diaphragm 75 which surrounds a seat 63 for receiving a drive shaft 56, as described below. At the periphery of the diaphragm 75 is a sealing edge 76 having an upwardly extending lip 77 and a downwardly extending lip 78 which cooperate to maintain an increased pressure in the containing chamber 58 when force is applied to the seat 63 by the drive shaft 56. The diaphragm 75 is preferably adapted to slightly elastically deflect when force is applied to the seat 63.

A top cap 81 is preferably installed on top of the cylinder 51 concealing the piston 57. The top cap 81 preferably includes a top flange 82 which slides snugly over a recessed shoulder 49 provided integrally with the cylinder 51. The top cap 81 may be adhered to the cylinder 51 using a suitable adhesive or other methods. Alternatively, the top flange 82 and recessed shoulder 49 may include corresponding threaded portions to removably connect the top cap 81 to the cylinder 51. The top cap 81 further includes an aperture 83 through which the drive shaft 56, described below, passes to actuate the piston 57. Preferably, a recess 84 is provided for receiving an identifying label or cover, which can be pulled off or punched through by the dispensing actuator.

Figure 3:
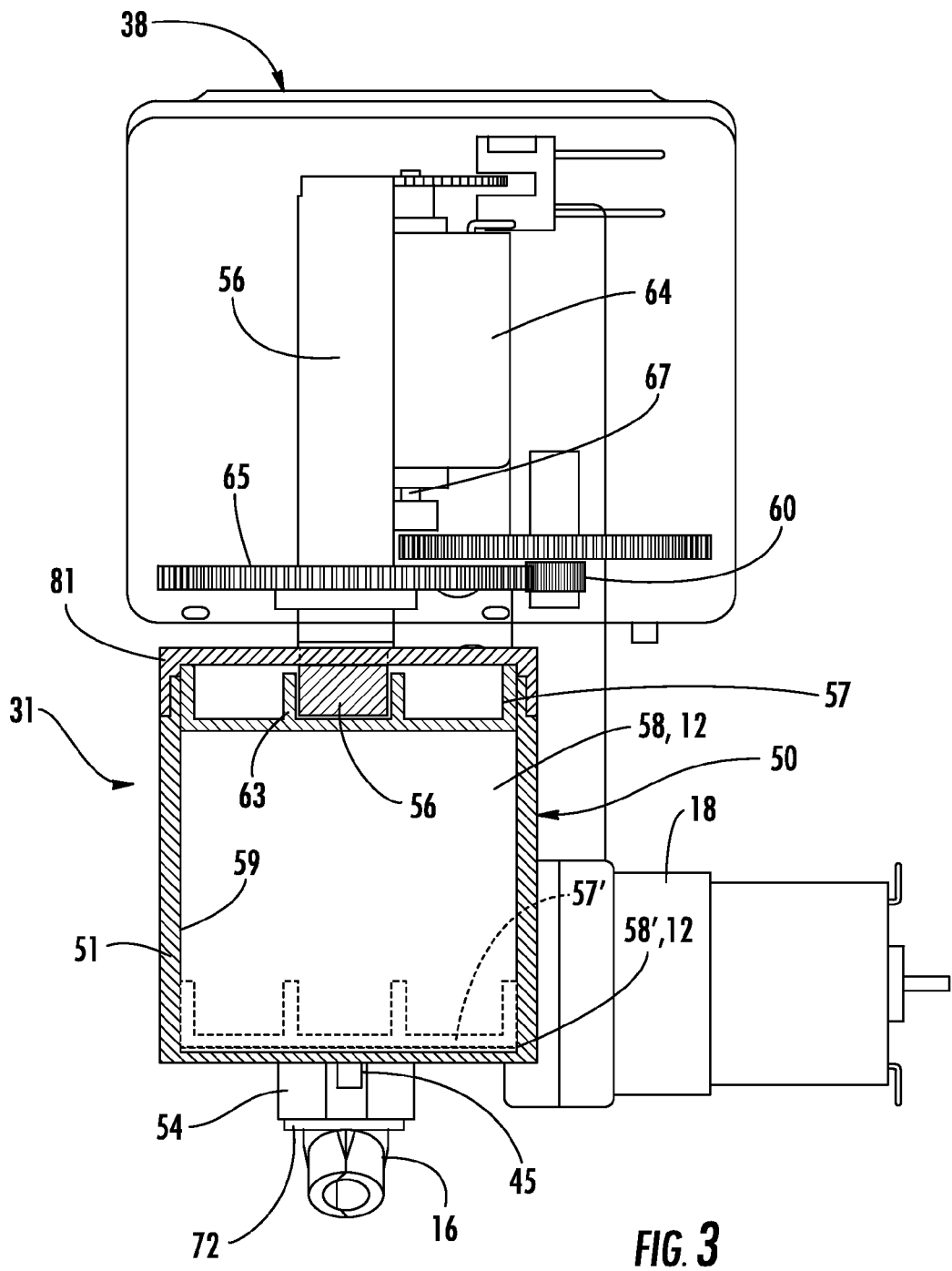
FIG. 3 is a front elevational view of a concentrate dispensing mechanism of the beverage dispenser of FIG. 1.
Figure 3A:
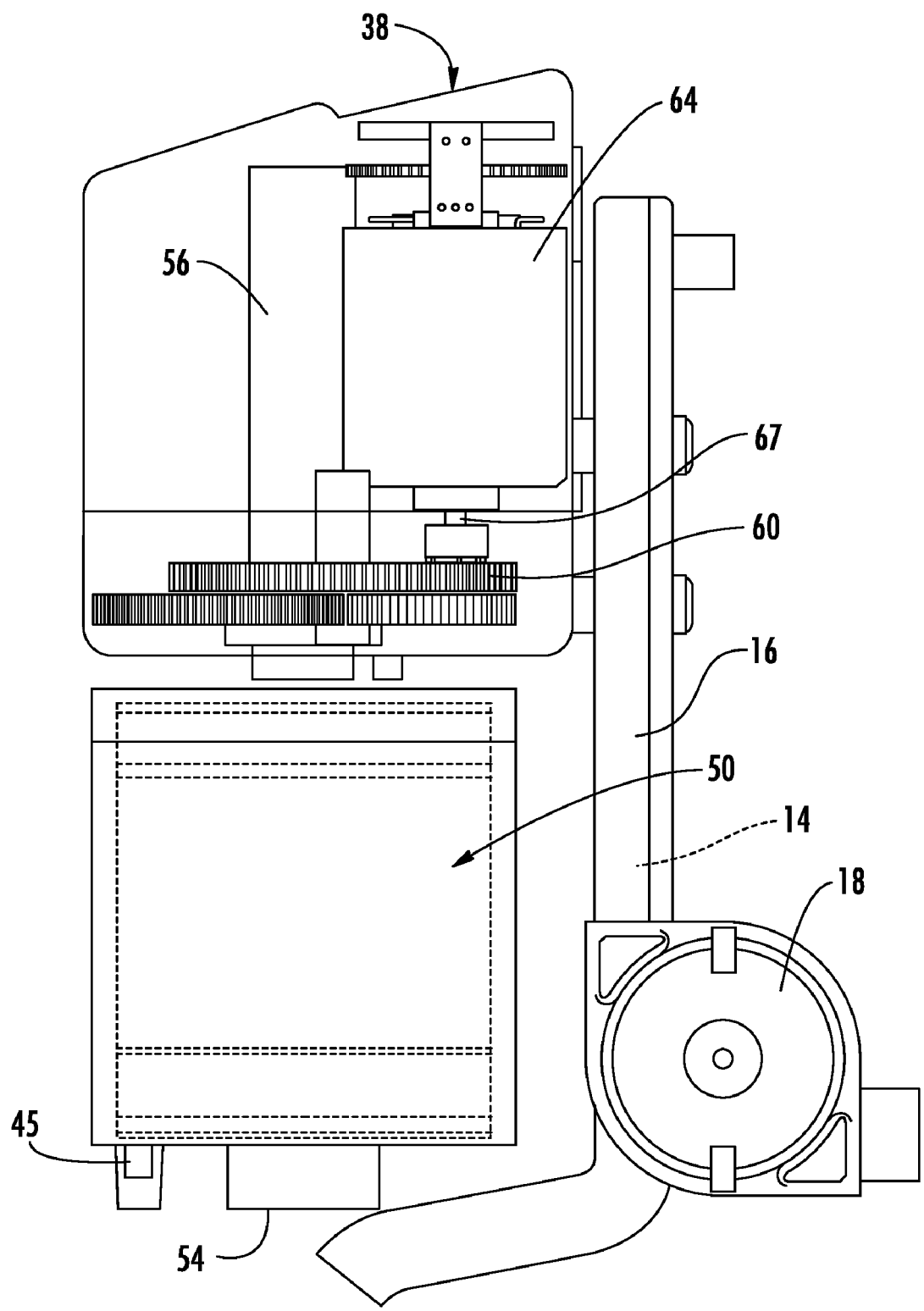
FIG. 3a is a side elevational view of the concentrate dispensing mechanism taken along line 3a-3a in FIG. 3.
Figure 4:
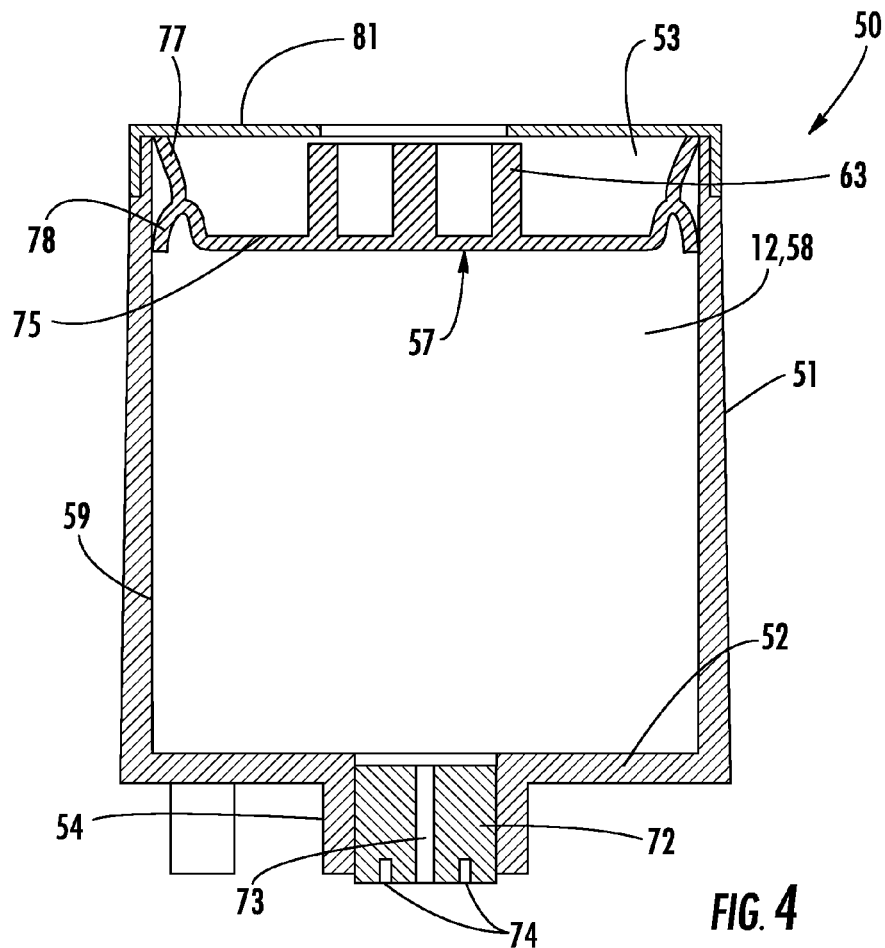
FIG. 4 is an elevational view of a concentrate/extract cartridge, in accordance with the present invention, for use with the beverage dispenser of FIG. 1.
Figure 5:
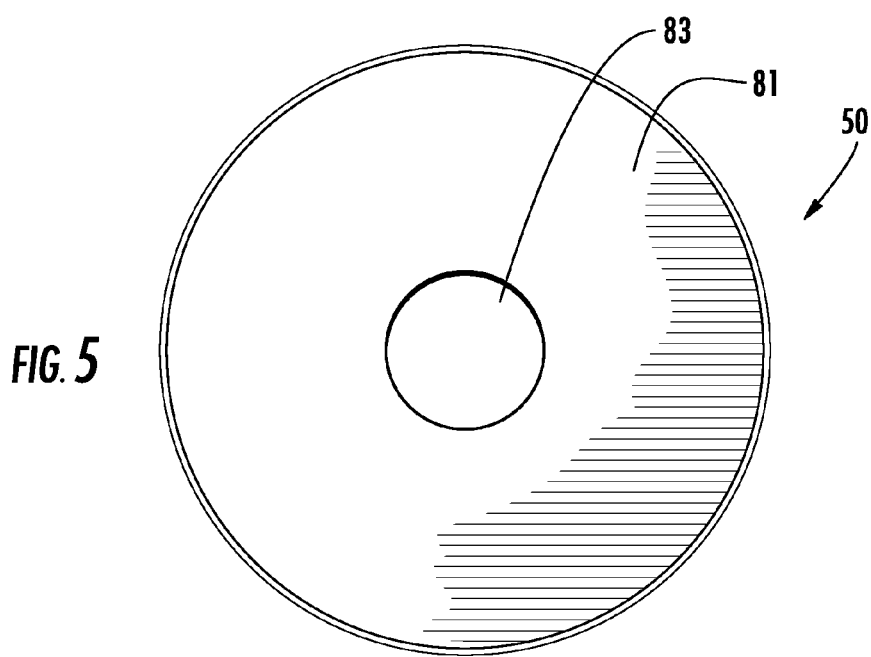
FIG. 5 is a top plan view of the concentrate/extract cartridge as shown in FIGS. 2-4.

Referring to FIGS. 3 and 3a, the cartridge dispensing actuator 38 includes a drive motor 64 connected to a plurality of interfacing gears 60 which in turn power a tapped gear 65 and a corresponding drive shaft 56. The drive shaft 56 and gears 60, 65 are preferably molded from a polymeric material. The drive shaft 56 is preferably threaded, for example with an acme screw thread, and engages a corresponding axially aligned tapped portion of the tapped gear 65. The motor 64 preferably drives one of the plurality of interfacing gears 60 via a motor drive shaft 67 setting the plurality of interfacing gears 60 and the tapped gear 65 into rotation. As the tapped gear 65 rotates, it causes the drive shaft 56 to translate in a direction along its axis. The drive shaft 56 travels through the aperture 83 in the top cap 81, which can help to guide the shaft 56, and engages the seat 63 in the piston 57 of the cartridge 50. The piston 57 is thereby axially translated/displaced resulting in discharge of the concentrate/extract 12 through the integral dispensing tube 54 and into the dispensing area 30. The piston 57 is movable from an initial position, as shown in FIG. 3, to a second position, shown in dash lines and indicated as 57' in FIG. 3, to reduce the size of the chamber 58, 58'.

One feature of the present invention is that the cartridge 50 is prevented from leaking concentrate/extract 12 from the orifice when not in use. As described above, the diaphragm 75 is adapted to slightly elastically deflect when force is applied to the seat 63. When force is released from seat 63 of the piston 57, the diaphragm 75 returns to its original non-deflected form causing concentrate/extract 12 within the integral dispensing tube 54 to be at least partially withdrawn back into the cylinder 51. This attribute results in part from the elasticity of the diaphragm 75, upwardly extending lips 77, and downwardly extending lips 78. Preferably, after dispensing a desired amount of concentrate/extract 12 from the cartridge 50, the controller 80 signals to briefly reverse the motor 64, slightly withdrawing the drive shaft 56 from the piston 57. This permits the piston 57 to return to its original form and create a vacuum within the chamber 58. This helps to prevent concentrate/extract 12 within the tube 54 from leaking into the dispensing area 30.

In the first preferred embodiment, the concentrate/extract cartridge 50 is disposable, for example when the cartridge 50 is emptied of a particular beverage concentrate/extract or if a user decides to switch cartridges in order to dispense a different type of beverage from the dispenser 10.

Prior to installing a cartridge 50, a user unscrews the bottom cap 68 from the end of the cartridge 50 and removes the foil pad 66 so that the dispensing tube 54 is open. However, due to the small diameter, preferably on the order of 1 mm or less, of the orifice 73 through the plug 72, the concentrate/extract does not exit due to the viscosity and/or meniscus force of the concentrate/extract based on the length of the orifice 73. The concentrate/extract will only exit under pressure from the drive shaft 56 against the piston 57, forcing the concentrate/extract through the dispensing tube 54 into the dispensing area 30.

With the plug 72 having an orifice 73 which is sized to be self-stopping due to the diameter of the opening, the length of the plug 72 and the viscosity and/or meniscus force of the concentrate/extract 12, no further sealing of the dispensing tube 54 is required once the cartridge 50 is installed in the dispenser 10. Those skilled in the art will recognize that the length and the diameter of the orifice 73 through the plug 72 can be varied, depending upon the viscosity and meniscus force of the liquid concentrate/extract 12 being dispensed in order to maintain the self-stopping characteristic.

A controller 80 is preferably located in the housing 20 and controls the motor 64 to discharge concentrate/extract 12 from the cartridge 50 when the diluent 14 is discharged, so that the concentrate/extract 12 and diluent 14 are dispensed into a container in the dispensing area 30. The controller 80 is preferably in a sealed electronics module in order to prevent inadvertent damage from moisture. Preferably, the controller is a PLC or other suitable electronic control device.

Figure 2B:
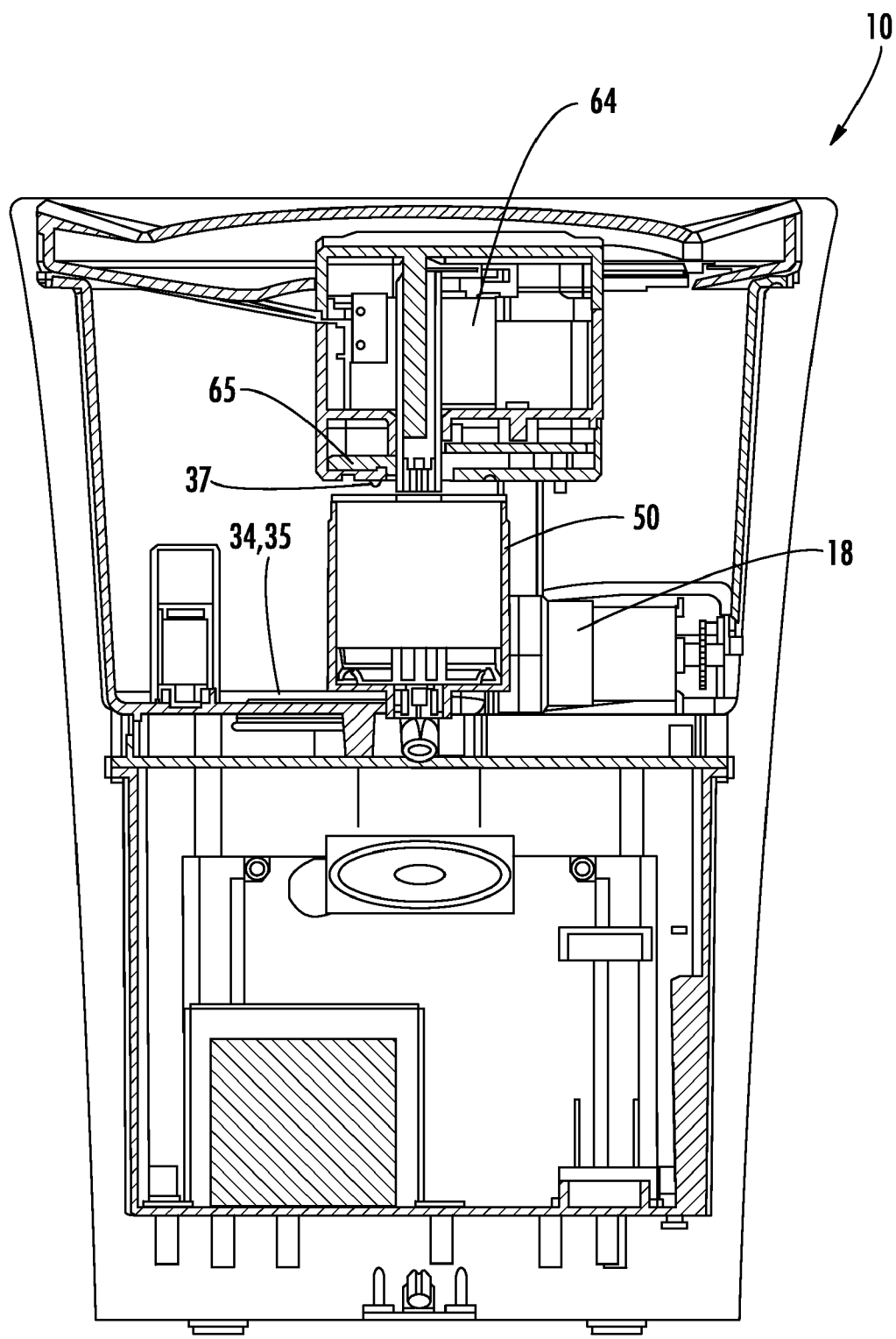
FIG. 2b is a front elevation view of the beverage dispenser of FIG. 1 partially in section.

As shown in FIGS. 2-2b, preferably, a power switch 89 is also connected to the controller to turn the power, supplied through a power line 86, off and on. A motor switch 87 for turning on the motor 64 in order to dispense concentrate/extract 12 from the cartridge 50 is supported within the housing 20 adjacent to the trigger extension 44 so that as the trigger 46 is pressed inwardly by a beverage container, the controller 80 is signaled to turn the motor 64 on in order to begin dispensing concentrate/extract 12 from the cartridge 50 at the same time that the pump 18, shown in FIG. 1, dispenses diluent 14 from the reservoir. A touch pad input control 90 is provided to vary the strength of the beverage allowing a user to select a desired strength of the beverage. This is used by the controller 80 to determine an amount of concentrate/extract 12 to be mixed with the diluent 14. This can be done by varying the speed by which diluent is dispensed or through varying the speed of the motor 64 to control the amount of extract dispersed. Preferably, the diluent 14 is pumped from the diluent reservoir 22 at a constant rate and the concentrate/extract 12 is dispensed from the cartridge 50 at a variable rate. In the preferred embodiment shown in FIG. 1, four separate beverage strengths are shown. A visual indicator, such as an LED 92 is then lit to show the beverage strength selected. Those skilled in the art will recognize that various numbers of different preset beverage strengths can be utilized and that the four strengths shown are merely exemplary. Additionally, the beverage strength could be continuously variable, based on a user control with selected ranges shown as preferred for different types of beverages. Alternatively, a switch can be provided to allow a user to signal the controller 80 which type of beverage is installed so that the controller 80 adjusts the amount of concentrate/extract being dispensed accordingly. Preferably, an ID 61 is provided on the cartridge 50 to indicate the type of beverage concentrate/extract 12 that is in the cartridge 50. The ID is preferably automatically recognized by the controller 80 through either a different shape or different indicia located on the cartridge 50, which contact is read by a sensor 37 located in the receiving area 31 when the cartridge 50 is installed. The ID 61 on the cartridge could also include a radio frequency identification (RFID) tag which communicates with an RFID reader positioned in or near the receiving area 31. Alternatively, the ID 61 on the cartridge could include a barcode or computer readable symbols readable by a barcode reader or other visual-type reader positioned in the receiving area 31. The alignment pin 45 may also function as ID indicia for activating one of a plurality of switches to inform the controller 80 which type of beverage is installed.

For heated beverages, the controller 80 is connected to the thermostat 36, as shown in FIG. 2a, and monitors a temperature of the diluent 14 in the reservoir 22. Preferably, a user control such as a pot 98 is connected to the controller 80 to allow a user to manually adjust the temperature of the diluent. Alternatively, the desired temperature can be programmed into the controller 80. An indicator light and/or sound can be provided when the dispenser has heated the diluent to a desired temperature so that a user knows that a hot beverage can be dispensed. Alternatively, if a flash heater is used, the thermostat 36 can control a temperature of the diluent 14 heated by the flash heater so that it is heated to a desired temperature. Preferably, a limit switch 88 is provided to signal the controller 80 when it detects a low level of diluent 14 in the reservoir 22. When the controller 80 receives a signal from the limit switch 88 indicating a low diluent level, the controller 80 shuts power to the heating element.

To dispense a beverage, a container, such as the beverage container 19, is pressed against the trigger 46, and the motor 64 is signaled to turn at a variable rate based on the beverage strength selected. At the same time, the diluent 14 is dispensed at a constant rate irrespective of beverage strength. This allows a beverage container of any size to be filled with a beverage having the desired strength. For example, if a six-ounce mug is utilized, the concentrate/extract 12 is dispensed at a fixed, selected rate, as controlled by the controller 80, and the diluent 14 is dispensed at a fixed rate determined by a speed of the pump 18 until five to six fluid ounces in total of the liquid concentrate/extract 12 and diluent 14 are dispensed. If a twelve-ounce glass were used, based on the dispensing rates being the same as the container is filled, the desired strength beverage is always assured.

By using a cartridge 50 having its own dispensing tube 54, the present invention ensures that the diluent 14, which in most cases is water or carbonated water, is the only thing that comes into contact with the dispenser reservoir 22, the pump 18 and the reservoir supply line 16. This prevents contamination of the components of the dispenser 10 with any beverage concentrate/extract 14 and allows easier cleaning as well as longer periods between cleaning of the dispenser 10, since it is not contaminated with any type of beverage material or residue. Additionally, the mixing of the concentrate/extract 12 and the diluent 14 occurs outside the dispenser 10 in the beverage container 19, so that various different types of beverages can easily be dispensed by merely replacing the cartridge 50 with a different cartridge having a different type of beverage concentrate/extract 12 therein.

Additional features of the invention include a diluent view window 91, located on the front of the dispenser 10, as shown in FIG. 1, which allows a user to see the level of diluent in the reservoir 22.

In accordance with the invention, replacement beverage cartridges 50 can be provided to allow different types of beverages to be dispensed. While in the preferred embodiment the cartridge 50 includes the cylinder 51 with the dispensing tube 54 provided thereon in communication with the concentrate/extract containing chamber 58, with the movable piston 57 located in the cylinder 51, those skilled in the art will recognize that other types of actuator mechanisms can be utilized. For example, a pneumatic actuator arrangement in which air is pumped into a space behind a piston in order to force beverage to be dispensed.

In the preferred embodiment, the chamber 58 formed by the cartridge cylinder 51 is roughly cylindrical and the piston 57 which defines a movable wall of the concentrate/extract containing chamber 58 also has a generally circular cross section. However, other cross-sectional shapes could be utilized.

Having described the dispenser 10 in accordance with the preferred embodiment of the invention, a method of dispensing a selected beverage made from concentrate/extract and a diluent 14 is provided. The method includes inserting a removable cartridge 50 with a selected beverage concentrate/extract 12 into the beverage dispenser 10. The cartridge 50 includes the dispensing tube 54 that extends into the dispensing area 30 of the dispenser 10. A diluent, such as water, is provided to the dispenser 10. This can be placed in the diluent reservoir 22, or could be provided by a pressurized diluent feed line coming from an outside supply. The dispenser 10 is actuated to dispense concentrate/extract 12 from the cartridge 50 and to dispense diluent 14 into a user's beverage container located in the dispensing area 30. The concentrate/extract 12 and the diluent 14 are mixed in the container 19, either through the turbulence of the liquids being dispensed or through further stirring.

In order to change the type of beverage being dispensed or upon the cartridge 50 for a given type of beverage being empty, the concentrate/extract cartridge 50 is removed and another concentrate/extract cartridge 50, either with the same or with a different beverage concentrate/extract, is inserted. This can be done at the user's preference based upon the type of beverage that a user desires. In accordance with the invention, the dispenser 10 can be used to dispense the different beverage without the need to clean out the dispenser 10 since a new dispensing tube 54 is provided with the beverage concentrate/extract cartridge 50.

Advantageously, the dispenser 10 in accordance with the present invention allows a desired beverage concentration to be selected, for example, by pressing on the touch pads 90 to make a selection of stronger or weaker beverage strength, as indicated by the LEDs 92. Once the desired strength of the beverage has been selected, the user presses a beverage container against the trigger 46, which signals the controller 80 to provide power to the motor 64 so that it is turned at a predetermined rate. The motor 64 rotates the plurality of gears 60 via motor shaft 67. A threaded portion of the tapped gear 65 is engaged with the threaded drive shaft 56 driving the shaft toward the piston 57 in a first direction, which defines the movable wall of the interior storage space 58 of the cartridge 50 reducing a volume of the interior space 58 and causing the beverage concentrate/extract 12 to be dispensed into a beverage container. The diluent 14 is dispensed at a desired, predetermined rate, depending upon the beverage strength selected, at the same time as the concentrate/extract 12 so that any volume of the beverage can be dispensed with the desired beverage strength.

In the preferred usage, the cartridges 50 are provided with coffee, tea or chocolate liquid concentrate/extracts so that the dispenser 10 can be used to dispense a respective one of hot coffee, hot tea or hot chocolate. Alternatively, the beverage dispenser 10 can be used to dispense any other type of beverage, for example soda or punch using a soda or punch liquid concentrate/extract and, for example, by providing a chilled diluent in the reservoir 22 or by providing a chilled source of diluent directly to the pump 18.

While the preferred embodiment of the cartridge 50 is for use in connection with dispensing beverages, and more preferably for dispensing hot beverages, the present invention could also find use in connection with dispensers for any type of liquid mixed from a concentrate/extract and a diluent. The concentrate/extract cartridge 50 could be used for dispensing fluid medicine, fluid food products such as baby food, fluid condiments and endless other food and non-food products. Also, the cartridge 50, if desired, could be used to dispense viscous fluids into a container alone, without a diluent, for viscous fluids which do not require dilution.

Referring now to FIGS. 8-14 a beverage dispenser 110 according to a second preferred embodiment of the present invention is shown. In this embodiment, each component identical or similar to a component depicted in the preferred embodiment shown in FIGS. 1-7 is represented by a similar numerical identifier. Each such identifier equals "100" plus the value of the numerical indicator depicting the identical or similar component shown in any one of FIGS. 1-7. For example, the reservoir 122 of the second embodiment of the beverage dispenser 110 is similar to the reservoir 22 of the dispenser 10.

Figure 9:
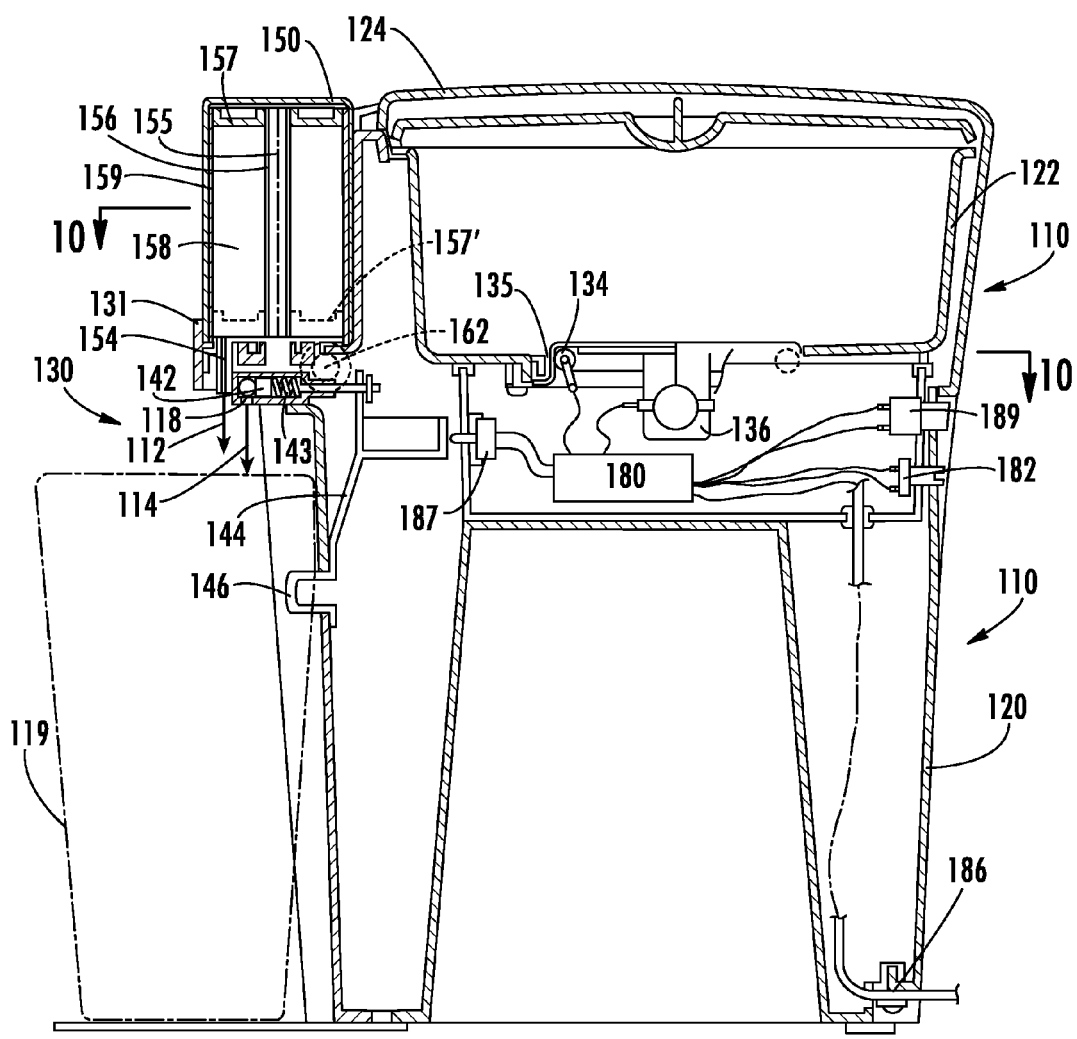
FIG. 9 is a cross-sectional view of the beverage dispenser of FIG. 8 taken along line 9-9 in FIG. 8.
Figure 10:
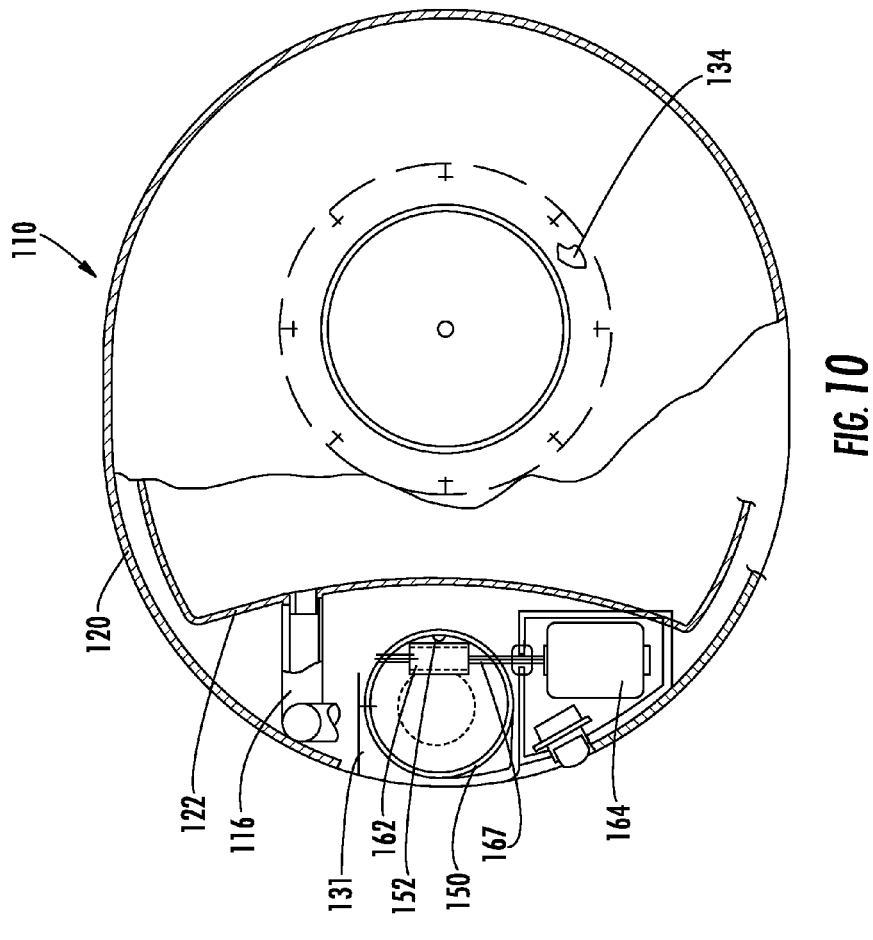
FIG. 10 is a cross-sectional view through the beverage dispenser of FIG. 8 taken along line 10-10 in FIG. 9.
Figure 12:
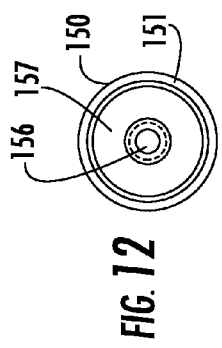
FIG. 12 is a cross-sectional view taken along line 12-12 in FIG. 11.

As shown in FIGS. 9 and 10, preferably a reservoir supply line 116 is connected to the reservoir 122 and delivers the diluent 114 to a control valve 118. The control valve 118 is in communication with the reservoir 122 to allow diluent 114 to be dispensed in the dispensing area 130. In the preferred embodiment, the control valve 118 includes a movable closing element 142, which is normally biased to a closed position via a spring 143. The closing element 142 is preferably connected via a mechanical linkage 144 to a trigger 146, which protrudes from the housing 122 below the dispensing area 130, where it can be contacted by a sidewall of a beverage container 119 in order to be opened.

Figure 8:
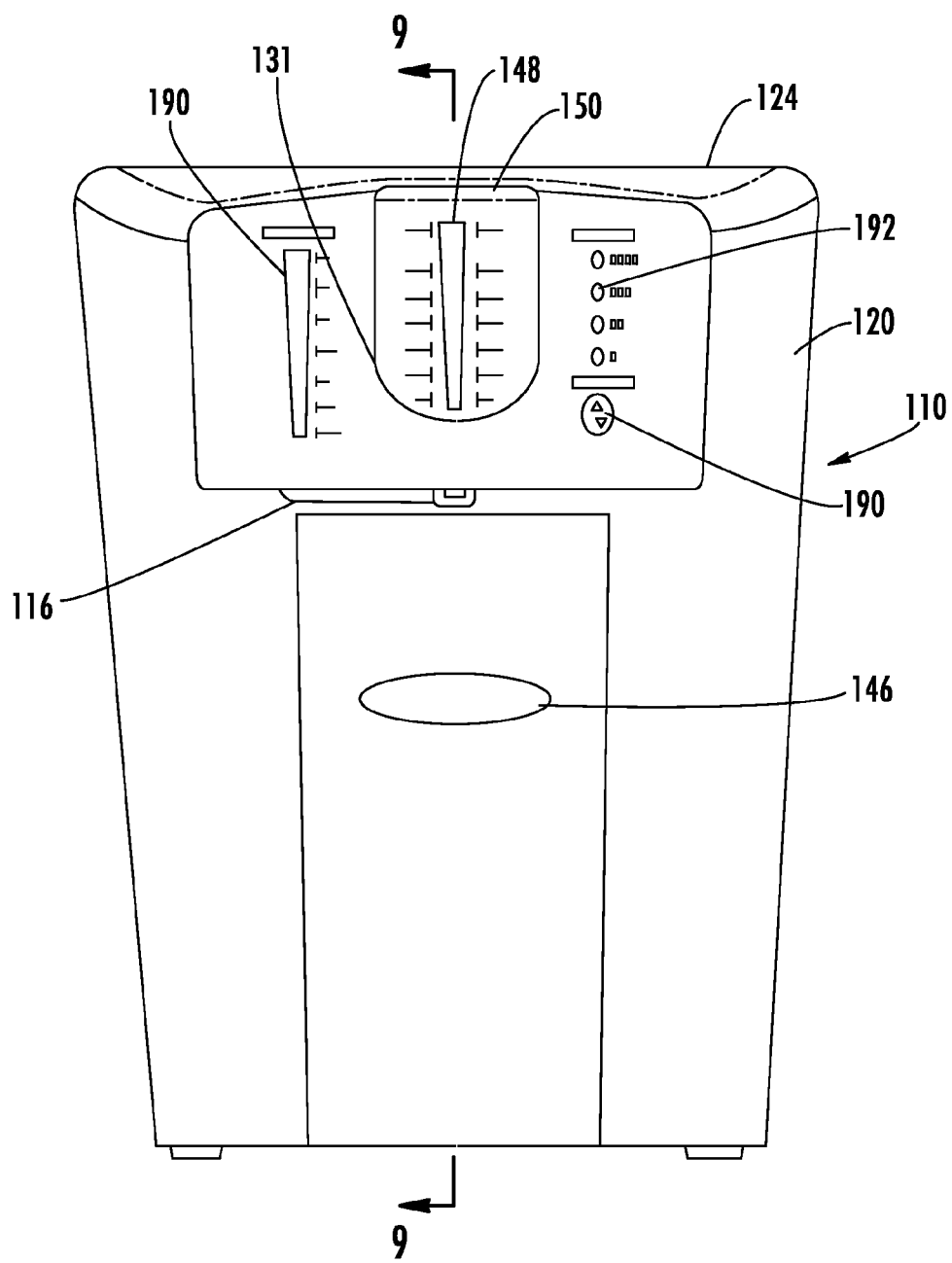
FIG. 8 is a front elevational view of a beverage dispenser in accordance with a second preferred embodiment of the present invention.

As shown in FIGS. 8-10, a cartridge receiving area 131 is located in the housing 120. The cartridge receiving area 131 is preferably in the form of a recess located in the housing having a complementary shape to a beverage concentrate/extract cartridge 150, described in detail below. The cartridge receiving area 131 preferably includes a key feature, such as a bump or projection 152, shown in FIG. 10, which is complementary to a mating key feature located on the cartridge 150 for alignment of the cartridge 150 in the cartridge receiving area 131. Alternatively, the outer shape of the cartridge itself can be asymmetrical in order to provide the key feature 152. As another alternative, as the cartridge 150 includes a cartridge dispensing tube 154, this can also act as the key feature 152 upon insertion of the cartridge 150 by the user.

As shown in detail in FIGS. 8-10, the concentrate/extract cartridge 150 is removably insertable into the cartridge receiving area 131. The concentrate/extract cartridge 150 is adapted to hold a beverage concentrate/extract and includes an actuator 155 for dispensing the concentrate/extract 112 from the concentrate/extract cartridge 150. The concentrate/extract dispensing tube 154 extends to the dispensing area 130 upon the concentrate/extract cartridge 150 being located in the receiving area 131.

In a preferred embodiment, the actuator 155 comprises a drive shaft 156 with a piston 157 located in the concentrate/extract cartridge 150. The piston 157 is movable from an initial position, as shown in FIG. 9, in which an interior storage space 158 of the cartridge and the piston 157 forms an inner wall of the interior storage space 158, to a second position, shown in dash lines and indicated as 157' in FIG. 9, in which the interior storage space 158 is reduced in volume, forcing the concentrate/extract 112 through the dispensing tube 154.

In a preferred embodiment, the drive shaft 156 is threaded, for example with an acme screw thread, and is engaged with a complementarily threaded opening in the piston 157. A drive gear 160 is located on an exterior of the cartridge 150 and is connected to the drive shaft 156. An interfacing gear 162 is located in the dispenser housing 120. In the preferred embodiment, the drive gear 160 is a spur gear and the interfacing gear 162 is a worm gear which engages the spur gear upon the cartridge 150 being inserted into the receiving area 131 of the dispenser housing 120. The interfacing gear 162 in the dispenser housing 120 is connected to a drive motor 164 which is controlled via a controller 180, as described in detail below. The motor 164 preferably drives the interfacing gear 162 via a motor drive shaft 167, as shown in FIG. 10. As the motor 164 turns the interfacing gear 162, the drive gear 160 located on the cartridge 150 turns the drive shaft 156 and the threads on the drive shaft 156 engaged with the complementary threads in the center of the piston 157 draw the piston downwardly, forcing the concentrate/extract 112 through the dispensing tube 154 and into the dispensing area 130.

Figure 11:
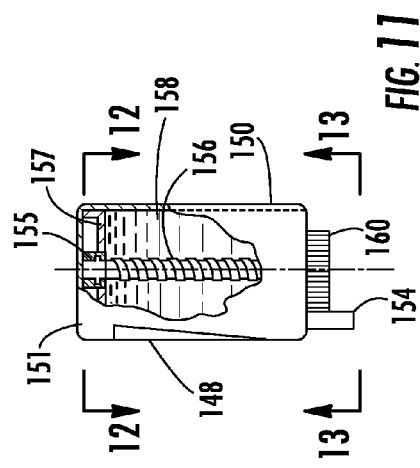
FIG. 11 is a side elevational view of the concentrate/extract cartridge used in the beverage dispenser of FIGS. 8-10.
Figure 13:
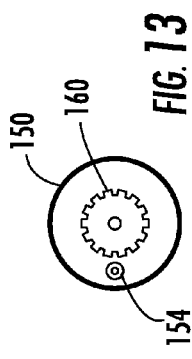
FIG. 13 is a bottom view of the concentrate/extract cartridge of FIG. 11 taken along line 13-13 in FIG. 11.
Figure 14:
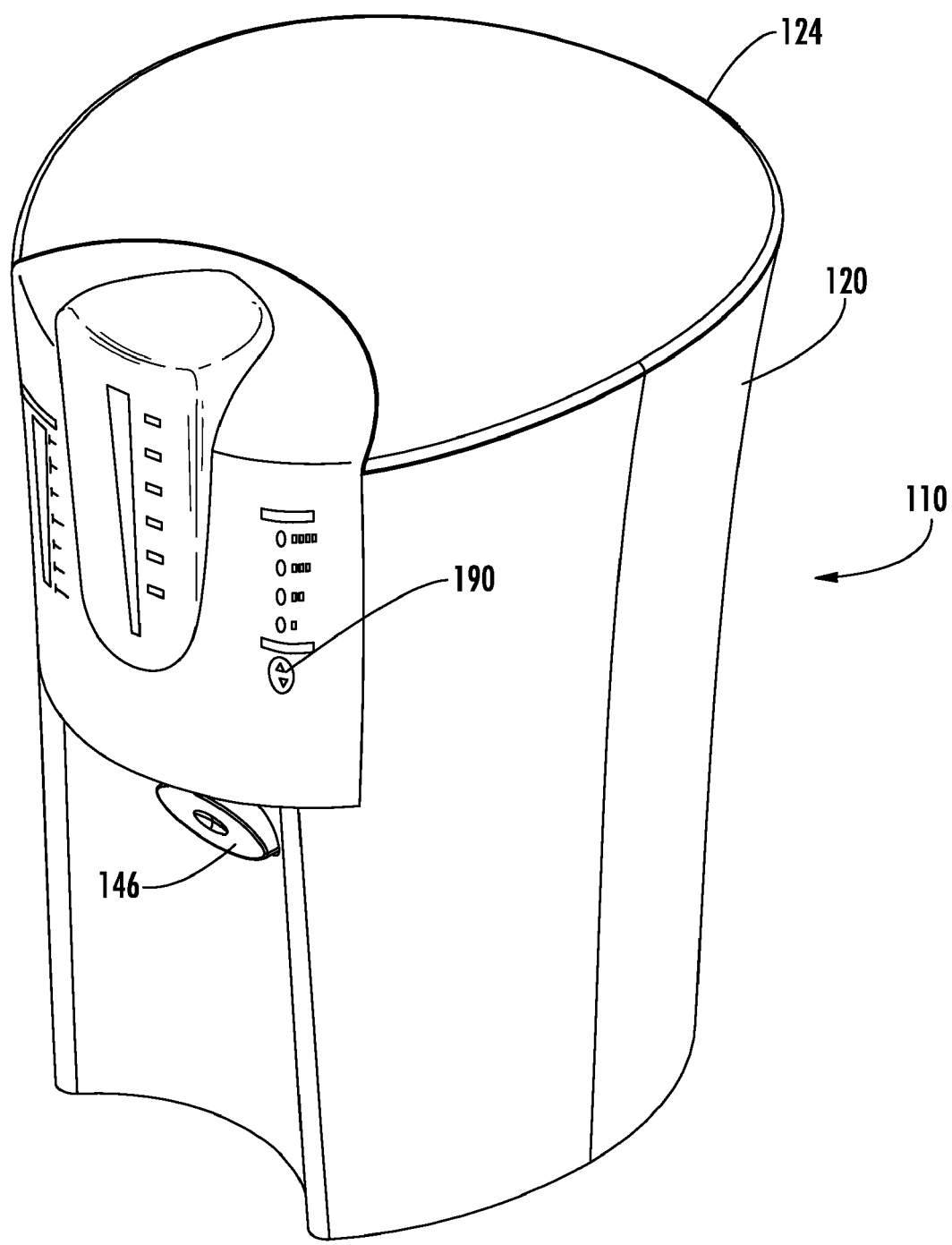
FIG. 14 is a perspective view of the beverage dispenser of FIG. 8, showing the removable concentrate/extract cartridge in the installed position.

The concentrate/extract cartridge 150 preferably includes a housing or cylinder 151, as shown in detail in FIG. 11, and includes a concentrate/extract view window 148 located along a front thereof, as shown in FIGS. 8 and 11, in order to allow a user to determine the volume of concentrate/extract 112 remaining in the cartridge 150.

Advantageously, the dispenser 110 in accordance with the present invention allows a desired beverage concentration to be selected, for example, by pressing on the touch pad 190 to make a selection of a stronger or weaker beverage strength, as indicated by the LEDs 192. Once the desired strength of the beverage has been selected, the user presses the beverage container 119 against the trigger 146, which opens the control valve 118 while at the same time signals the controller 80 to provide power to the motor 164 so that it is turned at a desired, predetermined rate. The motor 164 rotates the worm gear 162 via motor shaft 167. The worm gear 162 is engaged with the spur gear 160, located on the concentrate/extract cartridge 150 and rotates the drive shaft 156, so that the piston 157, which defines the movable wall of the interior storage space 158 of the cartridge 150, advances in a first direction, reducing a volume of the interior space 158 and causing the beverage concentrate/extract 112 to be dispensed at the desired rate into the beverage container 119. Preferably, the diluent 114 is dispensed at a predetermined rate, as noted above, at the same time as the concentrate/extract 112 so that any volume of the beverage can be dispensed with the desired beverage strength.

Referring now to FIGS. 15-21, a beverage dispenser 210 according to another alternative preferred embodiment of the present invention is shown. In this embodiment, each component identical or similar to a component depicted in the preferred embodiment shown in FIGS. 1-7 is represented by a similar numerical identifier. Each such identifier equals "200" plus the value of the numerical indicator depicting the identical or similar component shown in any one of FIGS. 1-7. For example, the housing 220 of the third embodiment of the beverage dispenser 210 is similar to the housing 20 of the dispenser 10.

Figure 15:
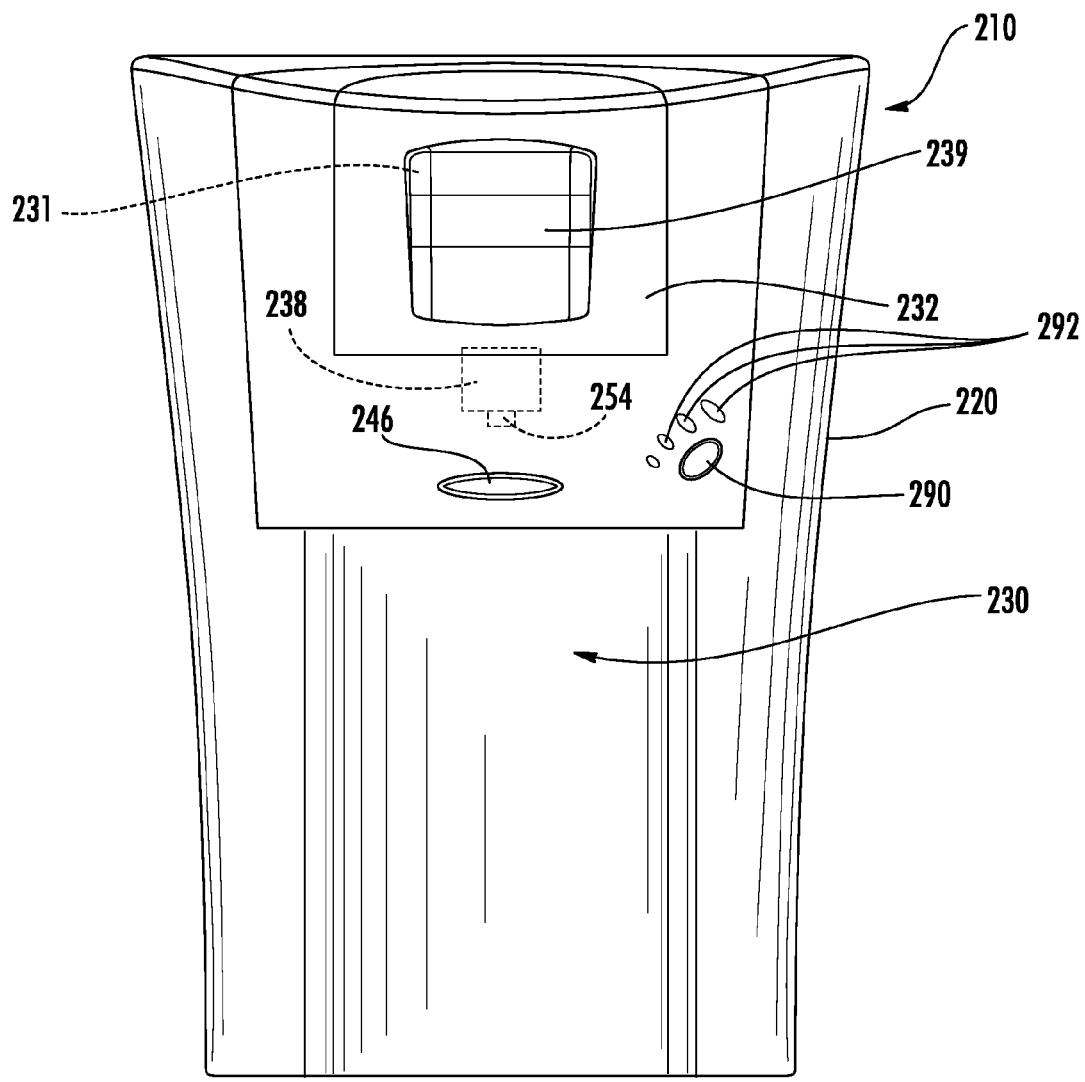
FIG. 15 is a front elevational view of a beverage dispenser in accordance with a third preferred embodiment of the present invention.
Figure 16:
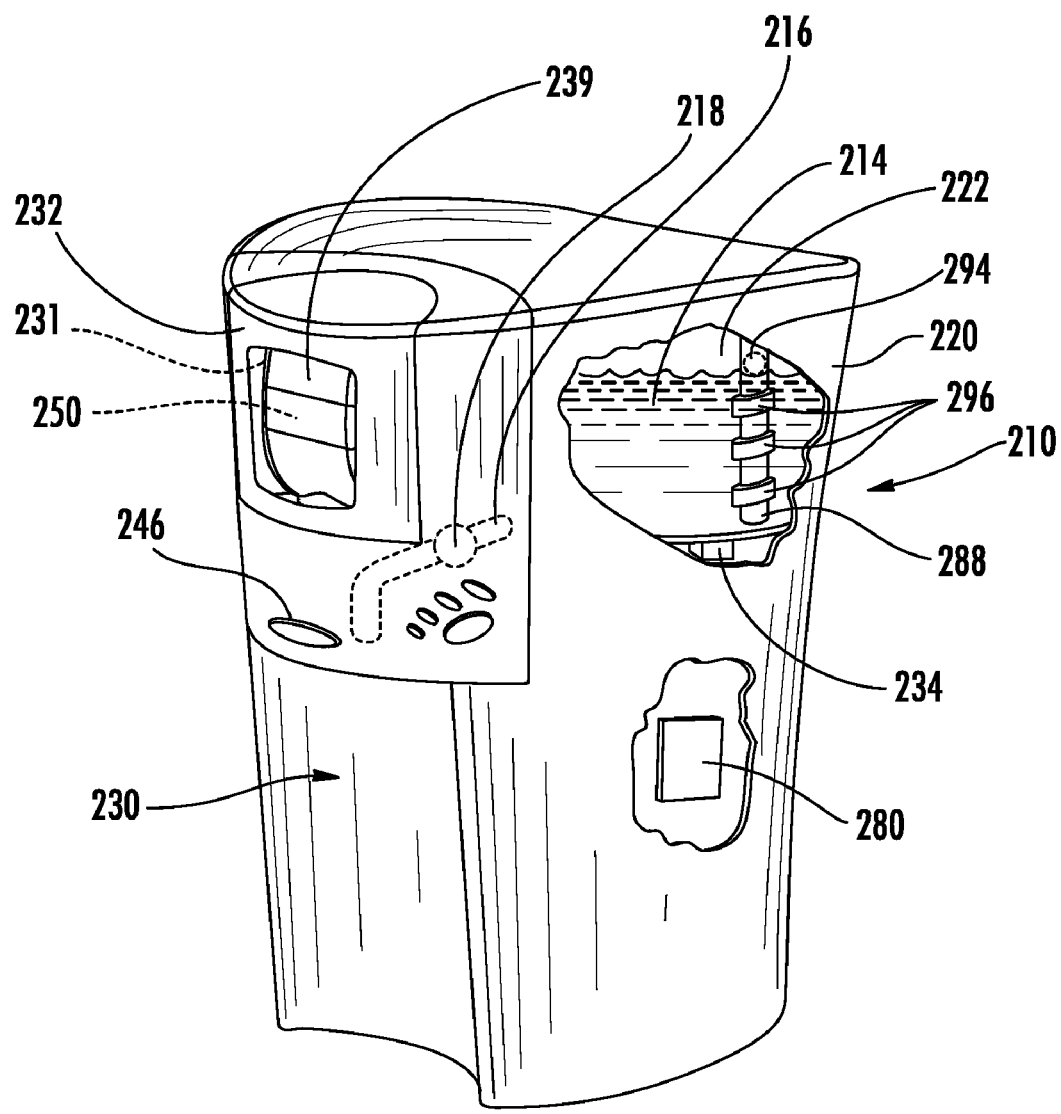
FIG. 16 is a left perspective view of the beverage dispenser of FIG. 15 showing a cutaway view of a diluent reservoir.

As shown in FIGS. 15-16, the beverage dispenser 210 includes a diluent reservoir 222 connected to a discharge valve 218 controlled by a controller 280 for dispensing diluent 214 into a dispensing area 230. Alternatively, in place of the discharge valve 218 a pump can be provided to empty diluent 214 from the reservoir 222. Preferably, a stack pipe 288 is provided for determining a level of the diluent 214 in the reservoir 222. The stack pipe 288 preferably includes a metallic float 294 and a plurality of spaced apart coils 296 for signaling a position of the float 294 to the controller 280. The information regarding the diluent level is used by the controller 280 to determine the diluent level of the diluent 214 in the reservoir 222. Since the static head of the diluent 214 in the reservoir is proportional to a rate of discharge of diluent 214, static head information is preferably used by the controller 280 to adjust a rate of actuation of a dispensing actuator 238, as described below, to dispense a desired amount of concentrate/extract 212 relative to an amount of dispensed diluent 214. Alternatively, based on the diluent level information received, the controller 280 can control the discharge valve 218, or alternatively a diluent discharge pump, permitting discharge of an appropriate amount of diluent 214 relative to an amount of dispensed concentrate/extract 212. The information regarding diluent level can also be used by the controller 280 to turn on and off a heating element 234 for heating the diluent 214. One skilled in the art will recognize that other diluent level detectors such as photo eye or electric resistance type detectors can be used to determine the diluent level in the diluent reservoir 222.

The dispenser 210 further includes a housing 220 having a loading door 232 which opens to a cartridge receiving area 231. The cartridge receiving area 231 is preferably in the form of a recess located in the housing 220 and is sized to receive a beverage concentrate/extract cartridge 250, described in detail below. The loading door 232 swings open for loading the cartridge 250 into the cartridge receiving area 231 in proximity to the dispensing actuator 238. A view window 239 is preferably provided on the loading door 232 to allow inspection of the cartridge 250.

Figure 17:
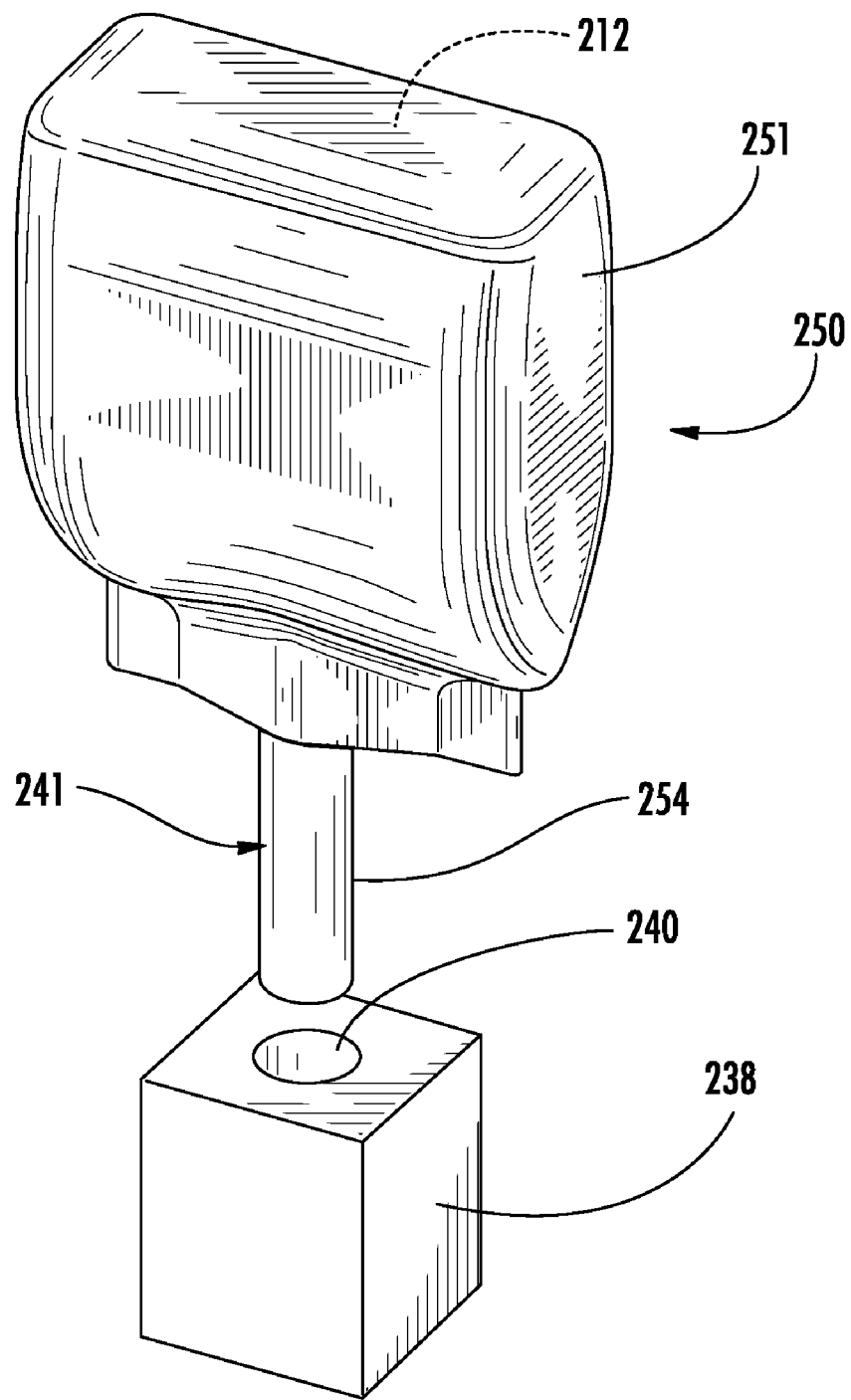
FIG. 17 is a perspective view of a concentrate/extract cartridge and a dispensing actuator of the beverage dispenser of FIG. 15 in a disengaged position.
Figure 18:
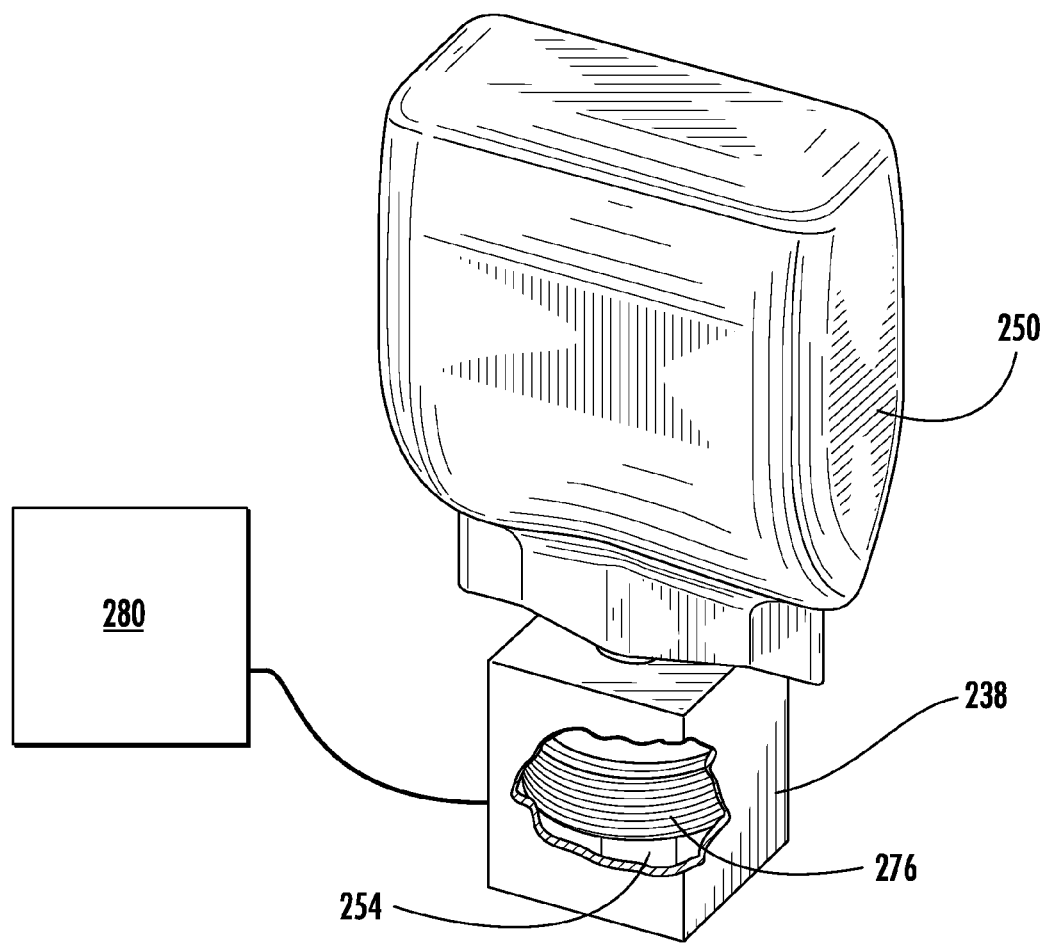
FIG. 18 is a perspective view of a concentrate/extract cartridge and a dispensing actuator of the beverage dispenser of FIG. 15 in an engaged position.

As shown in FIGS. 17 and 18, the cartridge 250 includes a hollow body 251 for containing the liquid concentrate/extract 212. The hollow body 251 is preferably collapsible and fabricated from a flexible laminate sheet including layers of one or more of polyethylene, polyester, and metallic foil. Alternatively, other suitable materials may be used to create the flexible laminate sheet. A nozzle assembly 241 having an interface member 252 is preferably sealably connected to the hollow body 251. An inner layer of the hollow body 251 preferably includes features, such as sealing bars, which contact and align with cooperating features on the interface member 252. During assembly, heat and pressure is applied for a predetermined period of time to the area where the hollow body 251 and the interface member 252 are in contact, sealably connecting the hollow body 251 to the interface member 252. Preferably, the inner layer of the hollow body 251 and the interface member 252 are made of the same material, for example polyethylene, or otherwise made of compatible materials, so that when heat and pressure are applied, the hollow body 251 and interface member 252 are sealed together. Alternatively, the interface member 252 can be adhered to the hollow body 251 using any suitable adhesive and/or adhering method.

Figure 19:
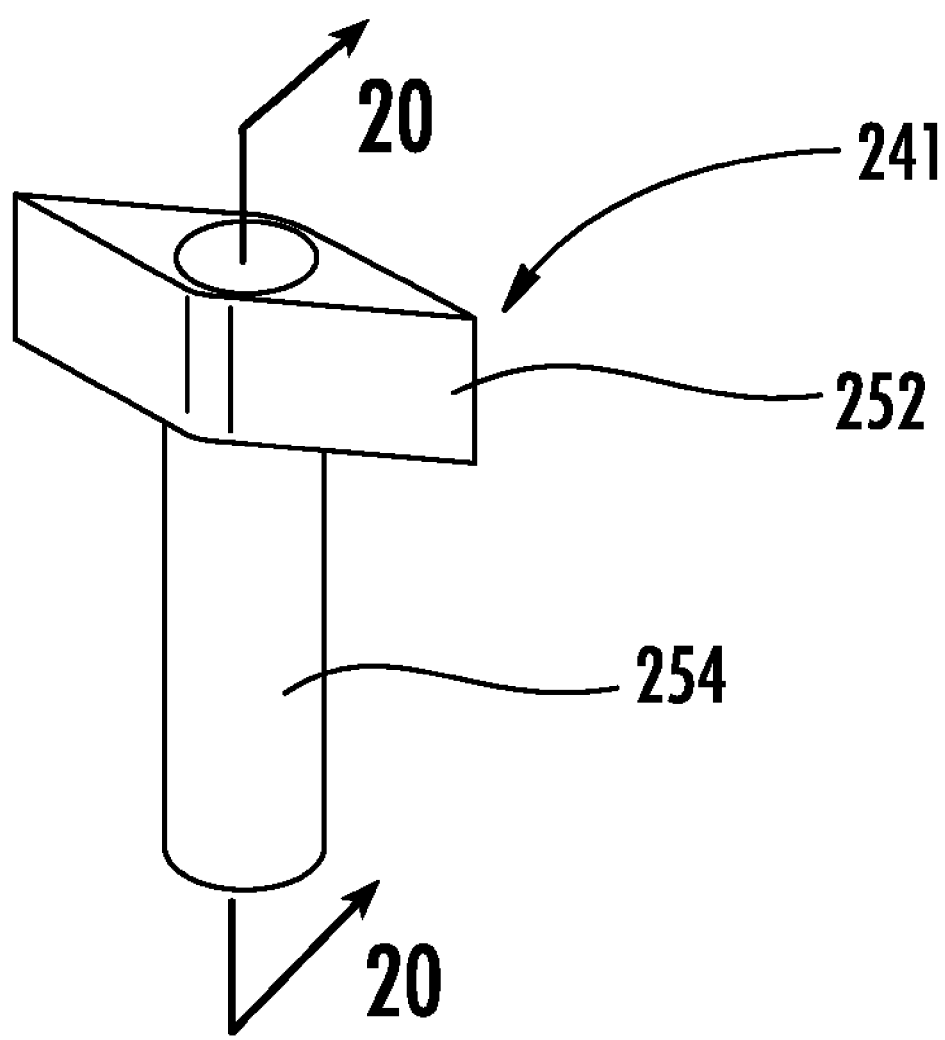
FIG. 19 is a perspective view of a nozzle assembly of the concentrate/extract cartridge of FIG. 15.
Figure 20:
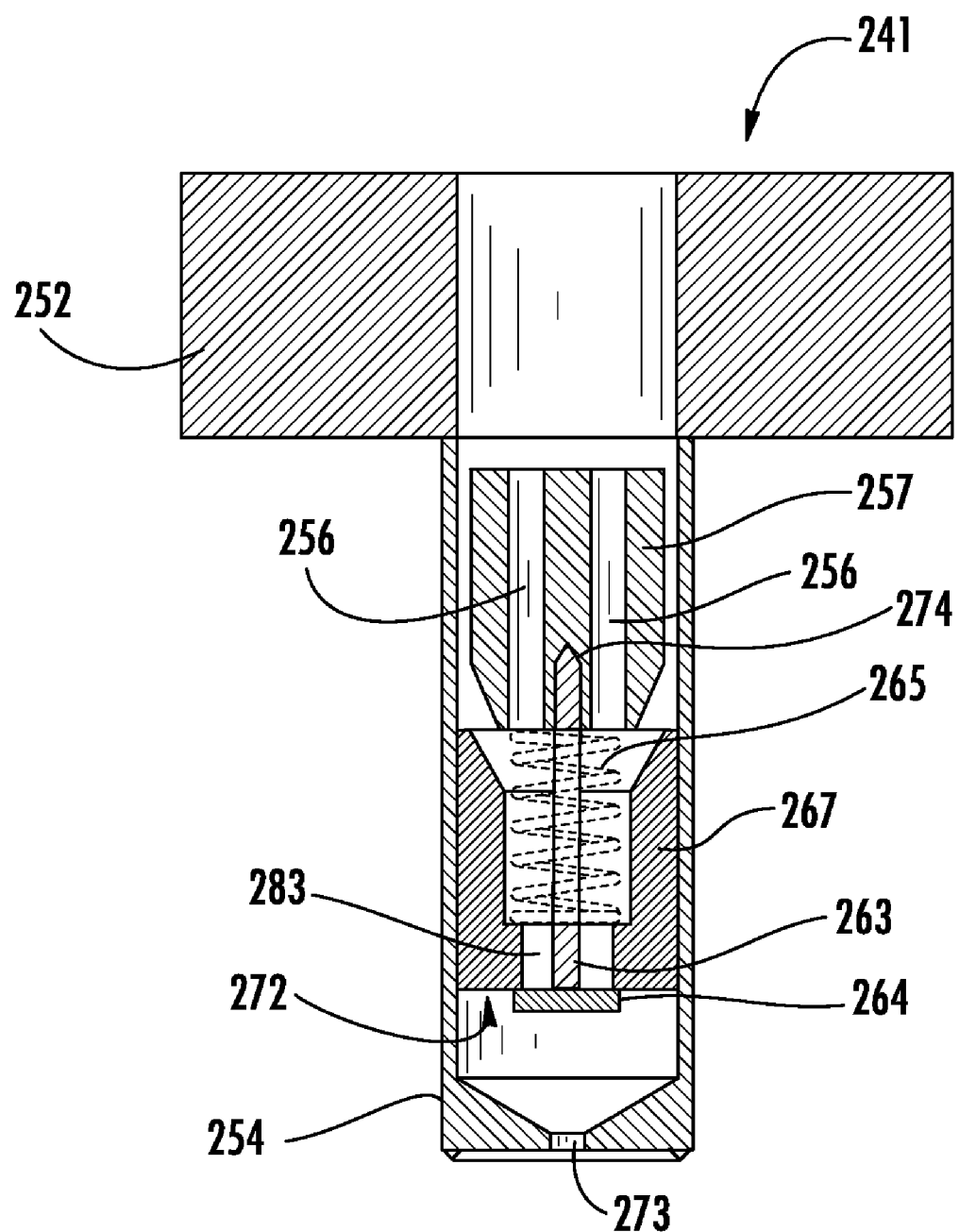
FIG. 20 is a cross-sectional view of the nozzle assembly of FIGS. 19 and 20 taken along line 20-20 in FIG. 19.
Figure 21:
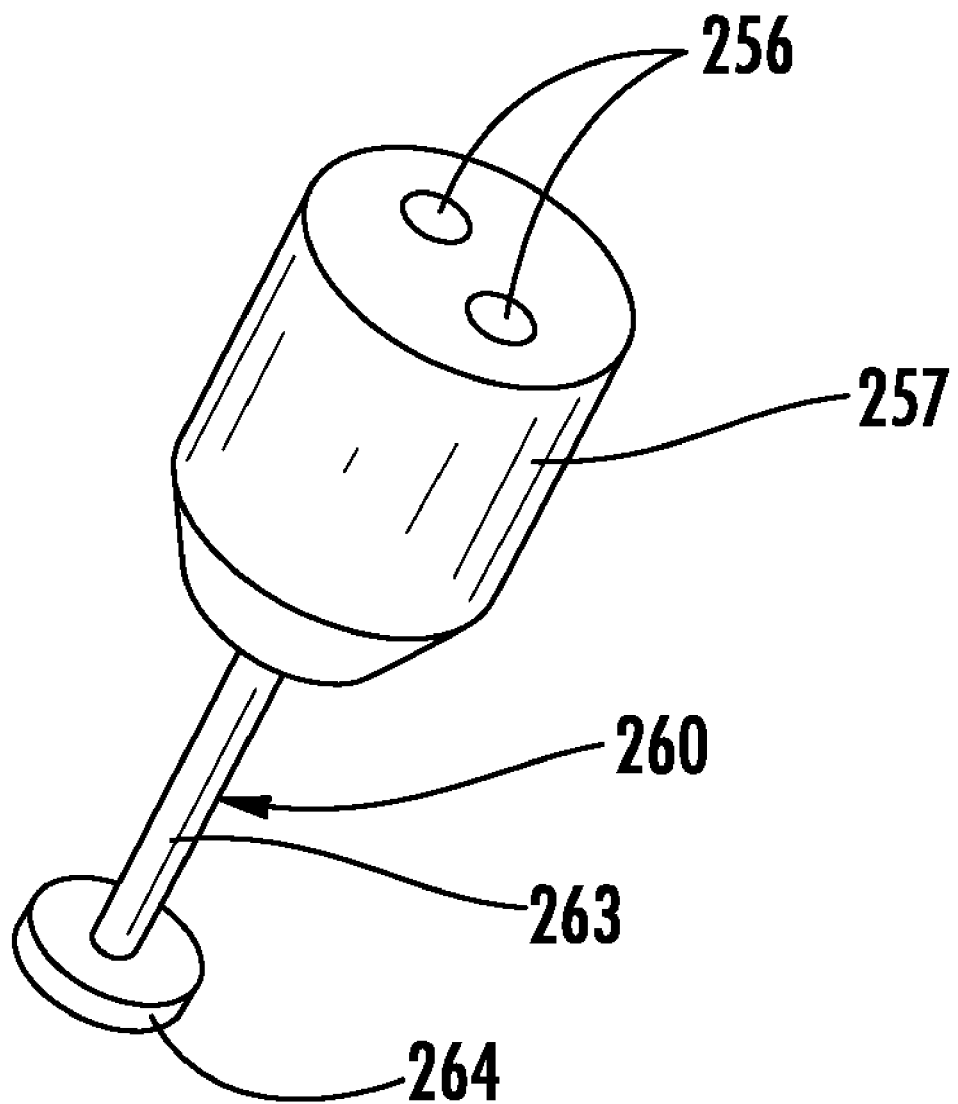
FIG. 21 is a perspective view of a valve-piston assembly of the nozzle assembly of FIGS. 19 and 20.

Referring to FIGS. 19-21, the nozzle assembly 241 preferably includes a dispensing tube 254, having an exit orifice 273, connected to the interface member 252, and a pumping device 272 positioned within the dispensing tube 254. The interface member 252 and the dispensing tube 254 are preferably separate components. In this manner, the interface member 252 can be adhered to the hollow body 251, then the hollow body 251 can be filled with a liquid concentrate/extract through an opening in the interface member 252, and then, the dispensing tube 254 can be connected to the interface member 252 closing the opening and allowing the liquid concentrate/extract to be retained by the pumping device 272. Alternatively, the dispensing tube 254 and the interface member 252 can be integrally formed. Further, in an alternative preferred embodiment, a sealing membrane can be provided in the dispensing tube 251 or interface member 252 to provide a hermetic seal between the contents of the hollow body 251 and the outside environment prior to use. The seal is preferably positioned upstream from the pumping device 272 to prevent the concentrate/extract from coming into contact with the pumping device 272. The seal can be pierced by a user prior to inserting the cartridge 250 into the housing 220, preferably using a piercing device provided on the dispensing tube 254 or the interface member 252.

The pumping device 272 includes a valve seat 267 connected to the dispensing tube 254 within a space defined by an interior surface of the dispensing tube. Preferably, the valve seat 267 is fixed via an interference fit with the interior surface of the dispensing tube 254. Alternatively, the valve seat 267 and the dispensing tube 254 can be connected using adhesive or mechanical fasteners. The valve seat 267 includes a port 283 for passing a flow of fluid concentrate/extract 212 through the dispensing tube 254. A valve stem 263 is connected to, and preferably integrally formed with, a valve body 264 forming a valve 260 for alternately covering and uncovering the port 283 in the valve seat 267. A piston 257 is connected to the valve stem 263 opposite the valve body 264 in slideable contact with or slightly spaced apart from the interior surface of the dispensing tube 254 for forcing concentrate/extract through the port 283. The piston 257 includes through apertures 256, for passing a flow of the liquid concentrate/extract 212, and blind aperture 274, to permit assembly with the valve stem 263. The through apertures 256 preferably have a depth which is at least double their width to provide flow resistance at higher piston velocity. A spring 265 is disposed between the piston 257 and the valve seat 267 to maintain the valve body 264 in contact with the valve seat 267 and prevent a flow of fluid through the valve port 283. The piston 257 is formed of a ferromagnetic material, such as steel or iron, to permit actuation by the actuator 238. Preferably, the valve seat 267 is also formed of a ferromagnetic material. The valve 260 and spring 265 are preferably formed of non-ferromagnetic materials, for example a polymer material or stainless steel.

Referring to FIGS. 17 and 18, the dispensing actuator 238 is fixed within the cartridge receiving area 231. The dispensing actuator 238 includes an electromagnet 276 which preferably comprises a wound coil. The electromagnet 276 receives current, such as alternating or direct current, from the controller 280. In a preferred embodiment, the controller intermittently provides a 120V/60 Hz half rectified voltage over the coil to produce currents which induce an intermittent magnetic field. The dispensing actuator 238 includes an opening 240 for receiving the dispensing tube 254 of the cartridge 250 therein. When the cartridge 250 is in an installed position in the receiving area 231, the piston 257 of the pumping device 272 is preferably located in proximity to an electromagnetic center of the electromagnet 276, for example the center of a wound coil.

The cartridge 251 dispenses the liquid concentrate/extract 212 as follows. Current is induced in the wound coil by an applied voltage, preferably a 120V/60 Hz half rectified voltage, over the electromagnet 276 as provided by the controller 280, causing the piston 257 to be drawn toward the electromagnetic center of the electromagnet 276 and against the valve seat 267. Alternatively, the controller 280 can provide other suitable voltages for producing alternating or direct current. The valve body 264, which is fixed to the piston 257, follows in a downward motion with the piston 257 and is displaced from the port 283 in the valve seat 267. During the downward motion of the piston 257, liquid concentrate/extract 212 located between the piston 257 and the valve seat 267 is forced through the port 283, as it is uncovered by the valve body 264, and out through the exit orifice 273 of the dispensing tube 254, while at the same time, fluid concentrate/extract from the hollow body 251 is drawn into the area above the piston 257 in the dispensing tube 254. The hollow body 251 is preferably collapsible and collapses to facilitate the extraction of fluid concentrate/extract 212 from the hollow body. Next, the controller 280 cuts off voltage to the actuator 238, causing the piston 257 to move upwardly away from the valve seat 267 by force of the spring 265. During upward motion of the piston 257, fluid concentrate/extract flows from the area above the piston 257 through the apertures 256 into an area between the piston 257 and the valve seat 267. A voltage, such as the preferred 120V/60 Hz half rectified voltage, or other suitable AC or DC producing voltage, is cycled on and off to provide an intermittent current for repeating the above-described process continuously until a desired amount of the liquid concentrate/extract 212 is dispensed.

A trigger 246 is provided, which when pressed signals the controller 280 to provide an intermittent current to the electromagnet 276 to initiate the dispensing of the liquid concentrate/extract 212 from the cartridge 250 into the dispensing area 230. At the same time, the controller 280 opens the diluent dispensing valve 218 to transfer liquid diluent 214 from the reservoir 222 into the dispensing area through a diluent supply line 216. Preferably, the supply line 216 and the dispensing tube 254 are directed such that during dispensing, a stream of discharged concentrate/extract 212 enters a stream of discharged diluent 214 to promote mixing. A touch pad input control 290, is provided to vary the strength of the beverage allowing a user to select a desired strength of the beverage. Visual indicators such as LEDs 292 indicate a selected beverage strength. User input from the input control 290 is used by the controller 280 to determine an amount of concentrate/extract 212 to be mixed with the diluent 214. This can be done by varying the speed by which the diluent 214 is dispensed by the dispensing valve 218, and/or by controlling the electromagnet 276 to vary the rate at which the pumping device 272 pumps. Preferably, the diluent 214 is dispensed from the reservoir 222 by gravity, and the liquid concentrate/extract 212 is dispensed from the cartridge 250 at a rate which is dependent on the selected beverage strength. The controller 280 preferably compensates for a decreasing reservoir diluent level by adjusting the rate at which the pumping device 272 pumps. The adjustment of the pumping rate of the pumping device 272 can occur several times, for example 8-10 times, during the dispensing of concentrate/extract 212 and diluent 214 into a single beverage container. Alternatively, the decreasing diluent level in the reservoir 222 can be compensated for during dispensing by opening the dispensing valve 218 wider or through the use of a pump, and the liquid concentrate/extract 212 can be dispensed from the cartridge 250 at a constant rate which is dependent only on the selected beverage strength.

One skilled in the art would clearly recognize that the concentrate/extract cartridge 250 could be adapted to hold and dispense a variety of other viscous fluids for various applications. The fluid dispensing cartridge 250 could be used for dispensing fluid medicine, fluid food products such as baby food, fluid condiments and endless other food and non-food products. Also, the cartridge 250, if desired, could dispense viscous fluids into a container alone, without a diluent, for viscous fluids which do not require dilution.

While the preferred embodiments of the invention have been described in detail above, the invention is not limited to the specific embodiments described which should be considered as merely exemplary. Further modifications and extensions of the present invention may be developed and all such modifications are deemed to be within the scope of the present invention as defined by the appended claims.

What is claimed is:

1. A method of dispensing a liquid from a liquid dispenser comprising:

providing a cartridge having;
    a hollow body for containing the liquid;
    an aperture defined in the hollow body; and
    an externally actuatable pumping device including:
        a dispensing tube which defines an interior surface connected to the hollow body at the aperture for dispensing the liquid from the hollow body;
        a valve seat, including a port for passing the liquid through the dispensing tube, connected to the dispensing tube and fixed within a space defined by the interior surface of the dispensing tube;
        a valve body in removable contact with the valve seat on a discharge side thereof which covers the port in a closed position and uncovers the port in an open position; and a piston located on an upstream side of the valve seat that is fixed to the valve body and is moveable within the dispensing tube for forcing the liquid through the port;

inserting the cartridge in the liquid dispenser; and moving the piston from a first position, away from the valve seat, in which the valve body is closed, to a second position, toward the valve seat and in a direction of liquid flow.

2. The method of claim 1, wherein at least one of the valve seat and the piston are ferromagnetic, and wherein the step of moving the piston from the first position to the second position includes inducing an electromagnetic field causing the piston to be drawn toward the valve seat.

3. The method of claim 2 further comprising returning the piston to the first position to move the valve body from the open position to the closed position.

4. The method of claim 3, wherein a biasing element applies a biasing force on the valve body toward the first position, and wherein the step of returning the piston to the first position includes reducing the electromagnetic field such that the biasing force overcomes the electromagnetic field.

5. The method of claim 1, wherein the piston includes a first side proximal to the hollow body and a second side proximal to the hollow body, and a displacement area is disposed between second side of the piston and the valve body, the method further comprising drawing the liquid from the hollow body and toward the first side of the piston by displacement during the step of moving the piston from the first position to the second position, and filling the displacement area with the liquid during the step of returning the piston to the first position.

6. The method of claim 5, further comprising repeating the steps of moving the piston from the first position to the second position while drawing the liquid from the hollow body and returning the piston to the first position to move the valve body from the open position to the closed position while filling the displacement area.

7. The method of claim 6, wherein the liquid is dispensed into a dispensing area and the dispenser includes a diluent reservoir, the method further comprising discharging a diluent from the diluent reservoir into the dispensing area when the liquid is dispensed.

8. The method of claim 7, the method further comprising inputting a desired amount of mixed liquid, which includes a mixture of the liquid and the diluent, and controlling the amount of the liquid dispensed and the diluent discharged based on the desired amount of mixed liquid.

9. The method of claim 7, wherein the cartridge includes a controller recognizable ID and the method further includes identifying a proper amount of the liquid to dispense and a proper amount of the diluent to discharge based on the controller recognizable ID.

10. The method of claim 9, wherein the controller recognizable ID is one selected from the group consisting of an RFID and a barcode.

11. The method of claim 1, wherein the liquid is a liquid concentrate/extract.

12. The method of claim 1 further comprising returning the piston to the first position to move the valve body from the open position to the closed position.

13. The method of claim 12, wherein a biasing element applies a biasing force on the valve body toward the first position, and wherein the step of returning the piston to the first position includes allowing the biasing force to return the piston to the first position.

14. The method of claim 12, wherein the piston includes a first side proximal to the hollow body and a second side proximal to the hollow body, and a displacement area is disposed between second side of the piston and the valve body, the method further comprising drawing the liquid from the hollow body and toward the first side of the piston by displacement during the step of moving the piston from the first position to the second position, and filling the displacement area with the liquid during the step of returning the piston to the first position.

15. The method of claim 14, further comprising repeating the steps of moving the piston from the first position to the second position while drawing the liquid from the hollow body and returning the piston to the first position to move the valve body from the open position to the closed position while filling the displacement area.

16. The method of claim 15, wherein the liquid is dispensed into a dispensing area and the dispenser includes a diluent reservoir, the method further comprises discharging a diluent from the diluent reservoir into the dispensing area when the liquid is dispensed.

17. The method of claim 15, the method further comprising inputting a desired amount of mixed liquid, which includes a mixture of the liquid and the diluent, and controlling the amount of the liquid dispensed and the diluent discharged based on the desired amount of mixed liquid.

18. The method of claim 17, wherein the cartridge includes a controller recognizable ID and the method further includes identifying a proper amount of the liquid to dispense and a proper amount of the diluent to discharge based on the controller recognizable ID.

19. The method of claim 18, wherein the controller recognizable ID is selected from one selected from the group consisting of an RFID and a barcode.

20. The method of claim 1, wherein the liquid is a liquid concentrate/extract.

* * * * *